US007953660B2

(12) United States Patent
Ganesan et al.

(10) Patent No.: US 7,953,660 B2
(45) Date of Patent: May 31, 2011

(54) METHOD AND SYSTEM FOR PAYMENT PROCESSING

(75) Inventors: Ravi Ganesan, Norcross, GA (US);
Peter Kight, Alpharetta, GA (US); Jim Magers, Atlanta, GA (US); Tim Herdklotz, Atlanta, GA (US)

(73) Assignee: CheckFree Services Corporation, Norcross, GA (US)

( * ) Notice: Subject to any disclaimer, the term of this patent is extended or adjusted under 35 U.S.C. 154(b) by 2508 days.

(21) Appl. No.: 09/820,803

(22) Filed: Mar. 30, 2001

(65) Prior Publication Data

US 2002/0087471 A1    Jul. 4, 2002

Related U.S. Application Data

(63) Continuation-in-part of application No. 09/749,597, filed on Dec. 28, 2000, now abandoned.

(51) Int. Cl.
*G06Q 40/00* (2006.01)
(52) U.S. Cl. ......................................................... 705/40
(58) Field of Classification Search .................... 705/35, 705/39, 40, 1, 1.1, 37; 709/228, 237; 385/1, 385/15
See application file for complete search history.

(56) References Cited

U.S. PATENT DOCUMENTS

| | | | | |
|---|---|---|---|---|
| 4,321,672 A | * | 3/1982 | Braun et al. ..................... | 705/42 |
| 4,823,264 A | | 4/1989 | Deming | |
| 5,025,373 A | | 6/1991 | Keyser, Jr. et al. | |
| 5,121,945 A | * | 6/1992 | Thomson et al. ................ | 283/58 |
| 5,220,501 A | | 6/1993 | Lawlor et al. | |
| 5,283,829 A | | 2/1994 | Anderson | |
| 5,326,959 A | | 7/1994 | Perazza | |
| 5,336,870 A | | 8/1994 | Hughes et al. | |
| 5,383,113 A | | 1/1995 | Kight et al. | |
| 5,420,405 A | | 5/1995 | Chasek | |
| 5,465,206 A | | 11/1995 | Hilt et al. | |
| 5,483,445 A | * | 1/1996 | Pickering ........................ | 705/40 |
| 5,504,677 A | | 4/1996 | Pollin | |

(Continued)

FOREIGN PATENT DOCUMENTS

JP    2002-041909 A    2/2002

OTHER PUBLICATIONS

PR Newswire, "Edify Highlights NCR Service Bureau's Success With Winning Internet Banking Solution"; Jul. 8, 1998; pp. 2-4.*

(Continued)

*Primary Examiner* — Ella Colbert
(74) *Attorney, Agent, or Firm* — Sutherland Asbill & Brennan LLP

(57) ABSTRACT

The present invention provides a method, system, and article of manufacture for providing payment services on a network. Information identifying a network user is received. The network user is assigned a payer status. A request to make a payment to a payee on behalf of the network user is received. If a first payer status is assigned to the network user, the payment will be made no matter the identity of the payee. If a second payer status is assigned to the network user, the payment will only be made if the payee is one of a group of payees that is not determined by the network user. With the second payer status, the network user can only direct payments to the group of payees. The payer status can be changed from one payer status to another payer status.

29 Claims, 18 Drawing Sheets

| REGISTERED USER | | STATUS | REGISTRATION DATE | NUMBER OF PAYMENTS | NUMBER NOT HONORED |
|---|---|---|---|---|---|
| NAME | UNIQUE IDENTIFIER | | | | |
| John Smith | 4529-se-44 | C | 12/01/01 | 7 | 0 |
| Jane Doe | 859-ru-485 | O | 05/18/00 | 45 | 0 |
| Fred Phelps | 35-5-x-665 | O | 05/15/01 | 19 | 3 |
| Rhonda Vu | BRZ-5498 | C | 07/01/00 | 0 | 0 |
| Bob Doe | 4g465df-4 | O | 03/25/99 | 212 | 4 |
| Denise Jones | 37-465DE | O | 09/09/00 | 31 | 0 |
| Bill Dee | 64768 | C | 06/19/00 | 2 | 1 |
| Acme Grocery | 46554-hy | O | 04/26/00 | 486 | 0 |
| Dianne Spry | 65-p15-46 | C | 07/19/00 | 24 | 0 |

U.S. PATENT DOCUMENTS

| | | | |
|---|---|---|---|
| 5,555,496 | A | 9/1996 | Tackbary et al. |
| 5,677,955 | A | 10/1997 | Doggett et al. |
| 5,699,528 | A * | 12/1997 | Hogan ............................ 705/40 |
| 5,710,889 | A | 1/1998 | Clark et al. |
| 5,717,989 | A | 2/1998 | Tozzoli et al. |
| 5,727,249 | A | 3/1998 | Pollin |
| 5,794,221 | A | 8/1998 | Egendorf |
| 5,815,665 | A | 9/1998 | Teper et al. |
| 5,825,856 | A * | 10/1998 | Porter et al. ................ 379/93.12 |
| 5,870,718 | A | 2/1999 | Spector |
| 5,873,072 | A | 2/1999 | Kight et al. |
| 5,884,288 | A | 3/1999 | Chang et al. |
| 5,920,847 | A | 7/1999 | Kolling et al. |
| 5,920,848 | A | 7/1999 | Schutzer et al. |
| 5,946,669 | A | 8/1999 | Polk |
| 5,956,700 | A | 9/1999 | Landry |
| 5,966,698 | A | 10/1999 | Pollin |
| 5,974,146 | A | 10/1999 | Randle et al. |
| 5,978,780 | A | 11/1999 | Watson |
| 5,984,180 | A | 11/1999 | Albrecht |
| 6,029,150 | A | 2/2000 | Kravitz |
| 6,032,133 | A | 2/2000 | Hilt et al. |
| 6,038,548 | A * | 3/2000 | Kamil ............................. 705/35 |
| 6,041,315 | A | 3/2000 | Pollin |
| 6,061,664 | A | 5/2000 | Pieterse et al. |
| 6,064,981 | A | 5/2000 | Barni et al. |
| 6,076,074 | A | 6/2000 | Cotton et al. |
| 6,078,907 | A * | 6/2000 | Lamm ............................. 705/40 |
| 6,085,172 | A | 7/2000 | Junger |
| 6,098,053 | A | 8/2000 | Slater |
| 6,128,603 | A * | 10/2000 | Dent et al. ...................... 705/40 |
| 6,138,106 | A | 10/2000 | Walker et al. |
| 6,151,588 | A | 11/2000 | Tozzoli et al. |
| 6,173,269 | B1 | 1/2001 | Solokl et al. |
| 6,175,823 | B1 | 1/2001 | Van Dusen |
| 6,188,994 | B1 | 2/2001 | Egendorf |
| 6,240,397 | B1 | 5/2001 | Sachs |
| 6,260,024 | B1 | 7/2001 | Shkedy |
| 6,288,319 | B1 | 9/2001 | Catona |
| 6,289,322 | B1 * | 9/2001 | Kitchen et al. ................. 705/40 |
| 6,292,789 | B1 * | 9/2001 | Schutzer ......................... 705/40 |
| 6,311,170 | B1 * | 10/2001 | Embrey .......................... 705/40 |
| 6,343,279 | B1 | 1/2002 | Bissonette et al. |
| 6,343,284 | B1 | 1/2002 | Ishikawa et al. |
| 6,343,738 | B1 | 2/2002 | Ogilvie |
| 6,363,362 | B1 * | 3/2002 | Burfield et al. ................ 705/40 |
| 6,438,527 | B1 * | 8/2002 | Powar ............................. 705/40 |
| 6,529,880 | B1 | 3/2003 | McKeen et al. |
| 6,594,647 | B1 | 7/2003 | Randle et al. |
| 6,609,113 | B1 | 8/2003 | O'Leary et al. |
| 6,701,303 | B1 * | 3/2004 | Dunn et al. ..................... 705/75 |
| 6,704,714 | B1 | 3/2004 | O'Leary et al. |
| 6,721,716 | B1 | 4/2004 | Gross |
| 6,754,637 | B1 | 6/2004 | Stenz |
| 6,826,544 | B1 | 11/2004 | Johnson |
| 7,089,208 | B1 | 8/2006 | Levchin et al. |
| 7,194,437 | B1 * | 3/2007 | Britto et al. .................... 705/40 |
| 7,296,004 | B1 * | 11/2007 | Garrison et al. .............. 705/404 |
| 7,702,579 | B2 * | 4/2010 | Neely et al. .................... 705/40 |
| 7,805,365 | B1 * | 9/2010 | Slavin et al. ................... 705/40 |
| 7,848,972 | B1 * | 12/2010 | Sharma ........................... 705/34 |
| 2001/0037290 | A1 | 11/2001 | Lai |
| 2001/0037295 | A1 | 11/2001 | Olsen |
| 2002/0016765 | A1 | 2/2002 | Sacks |
| 2002/0073049 | A1 | 6/2002 | Dutta |
| 2002/0087344 | A1 * | 7/2002 | Billings et al. ................... 705/1 |
| 2002/0152162 | A1 | 10/2002 | Eda et al. |
| 2004/0078329 | A1 * | 4/2004 | Kight et al. .................... 705/40 |

OTHER PUBLICATIONS

"Yahoo! Presents Yahoo! E-Bills; Yahoo! Expands Relationship with CheckFree to Provide Millions of Users Ability to Receive and View Bills Online"; Business Wire; Dec. 13, 1999; pp. 1-3.*

"Chase Gets Positive"; Bank Technology News; v. 14, n5; May 2000; pp. 1-6.*

"Keeping Banks in the Home EFT Driver's Seat"; Bank Network News; v13, n2; Jun. 13, 1994; pp. 1-4.*

Wells-eBay Partnership Tackles Online Checks. (Brief Article); Toonkel, by Jessica; American Banker; v165, n111; Jun. 9, 2000; pp. 1-3.*

How to put PC to work paying bills (on-line electronic bill-paying via microcomputer) (Computer File) (column); Magid, Lawrence J.; Jul. 25, 1991; p. 1.*

"Makeover men"; Clow, Robert; Institutional Investor; v33, n8; Aug. 1999; pp. 1-6.*

Anonymous; Management Accounting; London; "Communications in managing modern payment systems"; Jul./Aug. 1997; pp. 1-3.*

Special Report Series: Electronic Billing; Bank Technology News; "Electronic Bill Presentment: The Real Killer App?"; Sep. 1997; pp. 25, and34-36.*

Gregg, Leigh; Highbeam Research; "CUs plan electronic bill payment. (credit unions)(includes related article on Credit Union National Association Mutual Group piloting Bill-presentment program)"; Nov. 1, 1997; pp. 1-9.*

"Microsoft Corp. of Redmond, Wash., and First Data Corp. of Hackensack, N.J.;"Microsoft and First Data Form Internet Bill Payment Company; Aug. 1997; pp. 6-8.*

Carnegie Mellon University Inromation Ntworking Institute; "NetBill: 1994 Prototype TR 1994-11"; Aug. 1994; pp. 1-52.*

Ruaawll Redman; Bank Systems + Technology; "Business & Company Resource Center"; Nov. 1, 1997; pp. 1-3.*

S. Hansel, Electronic Checks to Pay Bills Over the Computer, The New York Times, Aug. 27, 1995.

J. Lenhart, Happy Holidays, High-Tech Style; Sending Cards Over the Internet Gains Popularity, The Washington Post, Dec. 20, 1998.

WishClick Kicks Off Marketing Campaign by Tempting Consumers With Tell-a-Friend Promotion; Register with WishClick and receive up to $50.00 I SuperCertificates from GiftCertificates.com, Business Wire, Nov. 2, 1999.

"Iconomy Lands Agreement with Lucidity; Provides Lucidity with Gifts for Online Shoppers." Business Wire, Dec. 22, 1999.

"Sparks.com, Web's Largest Greeting Card Store, has Perfect Greeting for the Holidays; With Huge Selection, Online Retailer Carries More Cards than Ten Drugstores." Business Wire, Dec. 10, 1998.

"Card Wars Result in Some Bitter Messages." Financial Times, Dec. 28, 1998.

"Person-to-Anywhere Payments are Here with Citibank's C2it." Credit Card News, Nov. 15, 2000.

"You've Got Money!" Bank Technology News, Jun. 2000, p. 1, vol. 13, No. 6.

Disclosure under 37 C.F.R. § 1.56.

giftpro.com, Dec. 3, 1998. <http://www.giftpro.com>.

GiveAnything.com, Nov. 27, 1999. <http://www.giveanything.com>.

Greenberg, I. "A Fistful of Flooz." U.S.News and World Report, May 3, 1999, vol. 126, No. 17.

U.S. Appl. No. 60/184,692, filed Feb. 24, 2000.

U.S. Appl. No. 60/206,618, filed May 24, 2000.

* cited by examiner

| REGISTERED USER | | STATUS | REGISTRATION DATE | NUMBER OF PAYMENTS | NUMBER NOT HONORED |
|---|---|---|---|---|---|
| NAME | UNIQUE IDENTIFIER | | | | |
| John Smith | 4529-se-44 | C | 12/01/01 | 7 | 0 |
| Jane Doe | 859-ru-485 | O | 05/18/00 | 45 | 0 |
| Fred Phelps | 35-5-x-665 | O | 05/15/01 | 19 | 3 |
| Rhonda Vu | BRZ-5498 | C | 07/01/00 | 0 | 0 |
| Bob Doe | 4g465df-4 | O | 03/25/99 | 212 | 4 |
| Denise Jones | 37-465DE | O | 09/09/00 | 31 | 0 |
| Bill Dee | 64768 | C | 06/19/00 | 2 | 1 |
| Acme Grocery | 46554-hy | O | 04/26/00 | 486 | 0 |
| Dianne Spry | 65-p15-46 | C | 07/19/00 | 24 | 0 |

*FIG. 7*

METHOD AND SYSTEM FOR PAYMENT PROCESSING

RELATED APPLICATIONS

This application is a Continuation-In-Part of application Ser. No. 09/749,597, entitled "Technique Of Registration For And Direction Of Electronic Payments In Real Time", filed Dec. 28, 2000 now abandoned.

TECHNICAL FIELD

The present invention relates generally to electronic commerce and more particularly to payment service user privileges.

BACKGROUND ART

Over the past several years an international network of networks known as the Internet has become increasingly popular. The Internet allows millions of users throughout the world to communicate with each other. To provide users with easier access to information available on the Internet, a World Wide Web has been established. The World Wide Web allows information to be organized, searched and presented on the Internet using hypertext. Thus, using the World Wide Web a user can submit a query for information and be linked electronically to information of interest which has been stored at Web locations on the Internet. Using hypertext, a user can also communicate information to other users of the Internet. Because of the use of hypertext, the information which can be queried and retrieved via the Internet includes not only textual information but also information in graphic, audio and video form. Web search engines and browsers have been developed to make searching and retrieval of information of interest on the Web a simple task. Hence, the Web has made it relatively easy for virtually anyone having access to a personal computer or other device connected to the Internet to communicate with others who are also connected to the network. This ease of use has resulted in an increase in the number of users utilizing the Internet.

With the proliferation of Internet users, numerous services are now provided over the Internet. One of the first such services to be offered was electronic banking. Electronic banking allows banking customers to access their account information and execute banking transactions, e.g. the transfer of funds from a savings to a checking account, by simply linking to a bank server using the Internet to access account information and communicate transfer instructions.

Electronic banking has advanced from this basic consumer-to-bank communication to a consumer being able to electronically pay bills and make other payment types and fund transfers to others by communicating instructions, via the Internet, to a service provider possibly distinct from the financial institute maintaining deposited or credited funds of a pre-registered payer. The payments are then made to the payee by the service provider. The term "payment" as used herein can include payment of bills as well as other payments not based upon bills. Funds from the payer's deposit or credit account, i.e. the payer's payment account, are debited by the service provider to cover the payment. The payment by the service provider to the payee can be made in any number of ways.

For example, the service provider may electronically transfer funds from the payer's banking account to the payee's banking account, may electronically transfer funds from a service provider's banking account, to the payee's banking account, may prepare a paper draft or check on the service provider's banking account and mail it to the payee, may prepare an electronically printed paper draft on the payer's banking account and mail it to the payee, or may make a wire transfer from either the service provider's banking account or the payer's banking account.

If the funds transferred to the payee are drawn from the service provider's banking account, funds from the payer's banking account are electronically or otherwise transferred to the service provider's banking account to cover the payment. Further, if the payment will be made from funds in the service provider's banking account, the payment will preferably be consolidated with payments being made to the same payee on behalf of other payers.

Accordingly, such electronic payment systems eliminate the need for a payer to write or print paper checks and then forward them by mail to the payee. This makes it easier and more efficient for the payer to make payments. Payees receiving consolidated payments no longer have to deal with checks from each payee and therefore can process payments more efficiently. The making of payments by the electronic or wire transfer of funds provides even further efficiencies in payment processing by payees, and it is well recognized that making payments electronically can significantly reduce the cost of processing payments for both the payer and the payee.

A payer must be a registered user of conventional electronic payment systems. Registration is required to protect a provider of electronic payment services from credit risk. To register a user, the service provider typically obtains and validates information relating to the user to verify the user's identity and processes the obtained information to determine if the service provider will accept the credit risk of making payments on the user's behalf. Registration may be a somewhat simplified process whereby a user submits, on-line, information identifying his or her bank account and financial institution and his or her identity. This information typically includes a name, address, phone number, and other identifying information, or some variation thereof. Other systems require that the potential user supply a voided check from the user's checking account.

Even with the simplified on-line information submittal, the payer is not able to immediately direct payments. After submitting registration information, the user must then wait for the service provider to validate and process the registration information and to receive a confirmation that the registration process is complete. This confirmation is typically sent from the service provider to the registering user via regular mail channels. Due to the processing and delivery time, the registering user is not able to immediately utilize the services of the electronic payment provider. Accordingly, a need exists for a technique whereby a user may immediately register and direct payments in a single on-line session.

A payment service provider benefits from economy of scale. That is, the more users a provider services, the lower the cost of providing those services. Credit risk processing, by design, eliminates potential payers from utilizing the services of a payment service provider. These potential payers, or users, may have a poor, incomplete, or non-existent credit history. As such, a payment service provider may be unwilling to accept the credit risk attendant in providing payment services to these potential users.

Current registration techniques also work against economy of scale another way. Certain potential users of payment services find disclosure of personal credit information unattractive. Because current techniques require that credit histories be processed, many of these potential users do not utilize payment services. Accordingly, a need exists for a technique to provide payment services to potential users, including those with poor, incomplete, or non-existent credit histories and those unwilling to disclose credit information, while shielding a payment service provider from financial risks.

Introduced above, the larger the number of customers a payment service provider services, the more efficiently the payment service provider can operate. Some conventional service providers attempt to entice potential customers to register by offering reduced introductory fees, or other enticements, for providing a payment service. Potential customers, to take advantage of these enticements, are still required to register. As discussed above, many potential users are unable to register due to poor credit histories, or are unwilling to register because of the unattractiveness of disclosing credit information. Additionally, some potential customers are unwilling to register because of the time involved, also discussed above. Accordingly, a need exists for a technique to entice potential new customers to utilize the services of a payment service provider which overcomes the inability or unwillingness of potential customers to register.

Another problem with typical registration techniques is that they are "all or nothing" techniques. That is, potential users are either accepted or denied registration, usually based upon credit risk processing. Conventional techniques do not provide for different levels of service, or privileges. Accordingly, a need exists for a registration technique whereby different users can become registered with different levels of service or privilege.

OBJECTIVES OF THE INVENTION

Accordingly, it is an objective of the present invention to provide a technique in which the number of users of a payment service is maximized while a payment service provider is protected from financial risk.

It is also an objective of the present invention to provide an adaptable payment service technique in which a user's privilege can vary.

It is yet a further objective of the present invention to provide a technique to entice users to utilize a payment service.

Additional objects, advantages, novel features of the present invention will become apparent to those skilled in the art from this disclosure, including the following detailed description, as well as by practice of the invention. While the invention is described below with reference to preferred embodiment(s), it should be understood that the invention is not limited thereto. Those of ordinary skill in the art having access to the teachings herein will recognize additional implementations, modifications, and embodiments, as well as other fields of use, which are within the scope of the invention as disclosed and claimed herein and with respect to which the invention could be of significant utility.

SUMMARY DISCLOSURE OF THE INVENTION

In accordance with a first embodiment of the present invention, a method for providing payment services via a network is disclosed. A system and an article of manufacture are provided for implementing the method. The network could be a public network, such as the Internet, a private network, such as a local area network, or any other type of network, including the public switched phone network.

According to the method of this first embodiment, information identifying a network user is received via the network. This network user is a potential payer. The information identifying the network user could be any one of, or any combination of, the network user's legal name, address, mailing address, business address, drivers license number, social security number, taxpayer identification number, telephone number, or any other identifying information. The network user could be an individual, business, or other organization. That is, payment services can be provided for individuals as well as businesses and organizations.

A payer status is assigned to the network user. The payer status is one of a first payer status and a second payer status. The payer status defines attributes associated with the network user when a request to pay a payee on behalf of the identified network user is received via the network.

If the first payer status is assigned, the payment will be executed, that is, made, whether or not the payee is within a defined plurality of payees. If the second payer status is assigned, the payment will be executed only if the payee is within the defined plurality of payees. Thus, if the network user is assigned the first status, the network user may direct that payments be made on his behalf to any payee. And, if the network user is assigned the second status, the network user may only direct that payment be made on his behalf to a payee that is included in the defined plurality of payees.

According to one aspect of the first embodiment of the present invention, the information identifying the network user is received from a sponsor of the network user. That is, the network user does not transmit the identifying information. Rather, a sponsor transmits the identifying information. A sponsor is an entity with which the network user maintains a relationship. A sponsor can be any entity, including, but not limited to, a financial institution, a Web portal, an on-line merchant, a brick-and-mortar merchant, a social or professional organization, or any other individual, group, or organization with which a network user may maintain a relationship. Beneficially, the relationship does not have to be maintained via the network.

According to another aspect, the request is executed, that is, made, by a payment service provider. A payment service provider is the individual, business, or organization which makes payments on behalf of the network user. According to this aspect of the present invention, the plurality of payees to whom payment can be made on behalf of the network user, if the network user is assigned the second status, is defined by at least one of the payment service provider and the sponsor, as described above. In this aspect, the identifying information does not have to come from the sponsor, though it could. Of these two entities which could determine the plurality of payees, only the payment service provider could determine the plurality of payees, only the sponsor could determine the plurality of payees, the payment service provider could determine a portion of the payees and the sponsor could determine a portion of the payees, or the payment service provider and the sponsor could, together, both determine the plurality of the payees. It should be understood that the network user does not determine the plurality of payees.

According to another beneficial aspect of this first embodiment, a plurality of payments are executed on behalf of the network user. Information associated with each of the plurality of payments is stored. Executing a payment on behalf of the network user includes a debit to a financial account associated with the network user. The financial account is maintained with a financial institution. Preferably the financial account is a deposit account, though it could be a credit account, a savings account, stored value account, or a brokerage account. The stored information associated with each of the plurality of payments includes at least one of, but is not limited to, the date each payment was executed, the number of payments executed on behalf of the network user, and an indication if the debit associated with a payment is not honored by the financial institution. It should be understood that the debit could be a paper debit, such as a check or draft, or an electronic debit. It should also be understood that a debit could not be honored by a financial institution for several reasons. These include, but are not limited to, insufficient funds in the account being debited, incorrect account numbers, or an account being closed or declared inactive.

Especially beneficial, according to a further aspect of this embodiment, an assigned payer status can be changed based upon the stored information associated with each of the plurality of payments directed by the network user. This includes both changing from the first status to the second status, and changing from the second status to the first status. All or part of the stored information, in addition to information not stored, could be utilized to change an assigned status.

According to another aspect of the first embodiment of the present invention, a credit risk is determined. The credit risk is a risk of loss in making payments on behalf of the network user. That is, the network user may not possess or have access to funds to cover the cost of the payment. The network user may not possess or have access to funds for any of several reasons, which include but are not limited to insolvency and fraud. The payer status is assigned based upon the determined credit risk. That is, if it is determined that there is a great risk of loss in making payments on behalf of the network user, the second payer status could be assigned. Likewise, if it is determined that there is a low risk of loss in making payments on behalf of the network user, the first payer status could be assigned.

In another further beneficial aspect of this first embodiment, an assigned payer status can be changed based upon a later determined credit risk in making payments on behalf of the network user. This includes both changing from the first status to the second status, and changing from the second status to the first status. That is, the credit risk is determined a second time. If the determination is different than the first determination, the network user's payer status can be changed.

According to an advantageous aspect of this embodiment of the present invention, the information identifying the network user is received during a real-time communication session. As above, the information could be received from the network user, or from another entity. As will be understood by one skilled in the art, a real-time communication session is an immediate exchange of information between two or more entities. The payer status is assigned to the network user during the real-time communications session. Thus, the assignment of the payer status is immediate.

In yet another aspect of the first embodiment, the defined plurality of payees is a defined first plurality of payees. Also, according to this aspect, a third payer status could be assigned to the network user. If this third payer status is assigned, the payment will be executed only if the payee is within a defined second plurality of payees. The network user could be assigned this third payer status, and if so, the network user may only direct that payment be made on his behalf to a payee that is included in the defined second plurality of payees. The first and second plurality of payees could be mutually exclusive, or could have overlapping membership.

According to a further aspect, the first plurality is determined by a first entity, and the second plurality is determined by a second entity different than the first entity. As above, the network user does not determine either plurality. The first entity could be the sponsor, discussed above. Or the first entity could be the payment service provider, also discussed above.

In a particularly advantageous aspect of this first embodiment of the present invention, the information identifying the network user includes information identifying a sponsor, discussed above.

The payer status, according to this aspect, is assigned based upon the identity of the sponsor. Thus, a sponsor relationship determines the assigned payer status. Thus could be either the first or the second status. In yet another aspect of this embodiment of the present invention, a plurality of payments are executed on behalf of a plurality of network users. These users could each be assigned any payer status, or perhaps even not any payer status. In any event, information associated with each of the payments is stored. The plurality of payees is determined based upon this stored information. Thus, the plurality of payees is determined based upon historical payment data for payments made to each respective payee. As discussed above, each of the plurality of payments includes a debit. The stored information includes at least one of, but is not limited to, information identifying a payee of each respective payment, a date of execution of each respective payment, and information indicating if the debit associated with each respective payment resulted in that debit not being honored by the respective financial institution. Any combination of the stored information could be used, in addition to information not stored, to determine the plurality of payees. It should be understood that information associated with payments to all payees, not just the plurality of payees, is stored.

As an example, a payee who is not included in the plurality of payees and who has received many payments, and none of the payments resulted in the debit not being honored, could be added to the plurality of payees. Or, a payee who is included in the plurality of payees, and to whom an excess of payments to that payee resulted in the debits not being honored, could be removed from the plurality of payees.

The system to implement this first embodiment of the present invention includes a memory, a communications port, and a processor. The processor is in communication with both the memory and the communications port. The processor could be any computing device capable of operating as described herein, including, but not limited to, a network server, a mainframe computer, or a personal computer. The memory may be any type memory capable of storing data, including random access memory, floppy or hard magnetic disk, or optical disk. The communications port may be any device capable of sending and receiving information via a network. It should be understood that the processor could be multiple processors operating in series or in parallel, the memory could include multiple types of storage, and that the communications port could be multiple communications ports, for example to communicate with multiple networks.

In accordance with a second embodiment of the present invention, a method for making a payment on behalf of a network user is provided. A system and an article of manufacture are provided for implementing the method. According to the method, information identifying a network user and a request to make payment on behalf of the identified network user are received via a network. The identifying information could be any of the identifying information discussed above, though, preferably, the information is a unique user identifier.

Based upon the received information, a mode of operation is selected. That is, the identity of the network user controls the mode of operation. The selected mode of operation is one of a first mode of operation and a second mode of operation.

Similar to the discussion above, if the first mode of operation is selected, the request is executed no matter the identity of the payee. If the second mode of operation is selected, the request will be executed only if the payee is one of a plurality of payees. Thus, in the first mode, payment can be made to any payee, and in the second mode, payment can be made to only predetermined payees. The system to implement this second embodiment of the present invention includes at least a processor, memory, and communications port, all as discussed above.

In accordance with a third embodiment of the present invention, a method for enrollment in an electronic payment service is provided. Here also, a system and an article of manufacture are provided for implementing the method. A request to enroll a network user in an electronic payment service is received via a network. The enrollment request includes information associated with the network user. As discussed above, this request could be received directly from the network user, or from another party. The information associated with the network user could be only information identifying the network user, or could be information not only identifying the network user, but also identifying a financial account associated with the network user such as a deposit account, credit account, or stored value account, among possible types of accounts. Also, the received information could be information associated with a credit history of the network user. Enrollment in the electronic payment service affords a network user the privilege to direct the electronic payment service to make payments on behalf of the network user.

The network user is enrolled based upon the received information. This basis could include ensuring that information has been received, or verifying the received information. A first user status is assigned to the enrolled network user. Preferably, this first user status is assigned to the network user immediately upon enrolling the network user, though it could be assigned at a time subsequent to the enrollment. A user status defines attributes associated with the network user in relation to the electronic payment service.

Subsequent to assigning the first user status to the enrolled network user, a credit risk associated with making payments on behalf of the enrolled network user, as discussed above, is determined based on the received information. This determination could include analyzing the received information as well as other information in addition to the received information. If the credit risk is determined to be below a predetermined threshold, the first user status is changed to a second user status. That is, if the risk in making payments on behalf of the network user is low, the first user status is changed to the second user status. It should be understood that, in this third embodiment, the network user is always first assigned the first user status. Then, if the determined credit risk is acceptable, the first user status is changed to the second user status.

As will be understood by reference to the discussion above, with the first user status assigned, a payment will be made on behalf of the enrolled network user to only one of a plurality of payees. The plurality of payees are determined by an entity other than the enrolled network user. That is, the electronic payment service, while the network user has the first user status, will only make payments on the network user's behalf to any one of the plurality of payees. Whereas, with the second user status assigned, a payment will be made on behalf of the enrolled network user to any payee designated by the enrolled network user.

According to another aspect of this embodiment of the present invention, the network user is enrolled and the first user status is assigned during a real-time communications session. That is, the network user is immediately enrolled and assigned a user status. Also according to this aspect, the credit risk is determined subsequent to the real-time communications session. Thus, in real-time, the network user is enrolled and assigned the first user status, then, at a later time, the credit risk is determined. Then, depending upon the credit risk determination, the first user status may or may not be changed to the second user status. In this manner, the network user can become enrolled in real time while the credit risk determination, which may require intensive or time consuming processing, can be performed subsequent to enrollment.

According to a further especially beneficial aspect of this third embodiment, a request to execute a payment on behalf of the network user is received during the real-time communications session and the request is accepted for execution during the real-time communication session. Thus, the network user can immediately enroll and direct payments. It should be understood from the discussion herein that if the payee is one of the plurality of payees, that accepting for execution also includes executing the payment. If the payee is not one of the plurality of payees, the payment will be accepted for execution, but not executed until and unless the credit risk determination is made and the determination results in changing the first user status to the second user status. If the determination results in the first user status not being changed, the request will preferably not be executed and the network user will be notified that the payment will not be executed.

In yet a further aspect of this embodiment of the present invention, a plurality of payments are executed on behalf of the network user. It should be understood that according to this aspect of the invention, the network user could have the first user status or the second user status when the payments are executed. If the network user has the first user status, the payments could all be executed previous to the credit risk determination, or the credit risk determination could have resulted in no change to the first user status. Also, all the payments could be executed subsequent to the credit risk determination.

Similar to the discussion above, information associated with each of the payments is stored. Based upon this information related to payments directed by the enrolled network user, a payment history status associated with the enrolled network user is determined. The payment history status is determined based upon payments executed on behalf of the network user. If the payment history status is determined to be a first payment history status, the first user status is assigned to the enrolled network user. If the payment history status is determined to be a second payment history status, the second user status is assigned to the enrolled network user. According to this aspect of the embodiment, the network user's status could remain unchanged due to the determined payment history status, or could change. If the status changes, it could change from the first user status to the second user status, or it could change from the second user status to the first user status.

According to a further aspect of the third embodiment, execution of a payment on behalf of the enrolled network user includes a debit, as described above. The information associated with each of the executed plurality of payments includes at least one of, but is not limited to, the following: information indicating if the debit associated with each respective payment resulted in that debit not being honored by the financial institution; information indicating a number of payments executed on behalf of the enrolled network user; and a date of execution of each respective payment.

The system to implement the third embodiment of the present invention includes at least a processor, memory, and communications port, all as discussed above.

It will be understood by those skilled in the art that each of the first, second, and third embodiments are easily implemented using computer software. More particularly, software can be easily programmed, using routine programming skill, based upon the description of the invention set forth herein and stored on a storage medium which is readable by a computer processor to cause the processor to operate such that the method of the respective embodiment is performed as described herein.

BRIEF DESCRIPTION OF DRAWINGS

FIG. 7 is an exemplary depiction of a registered user database in accordance with the present invention.

BEST MODE FOR CARRYING OUT THE INVENTION

Figure 1:
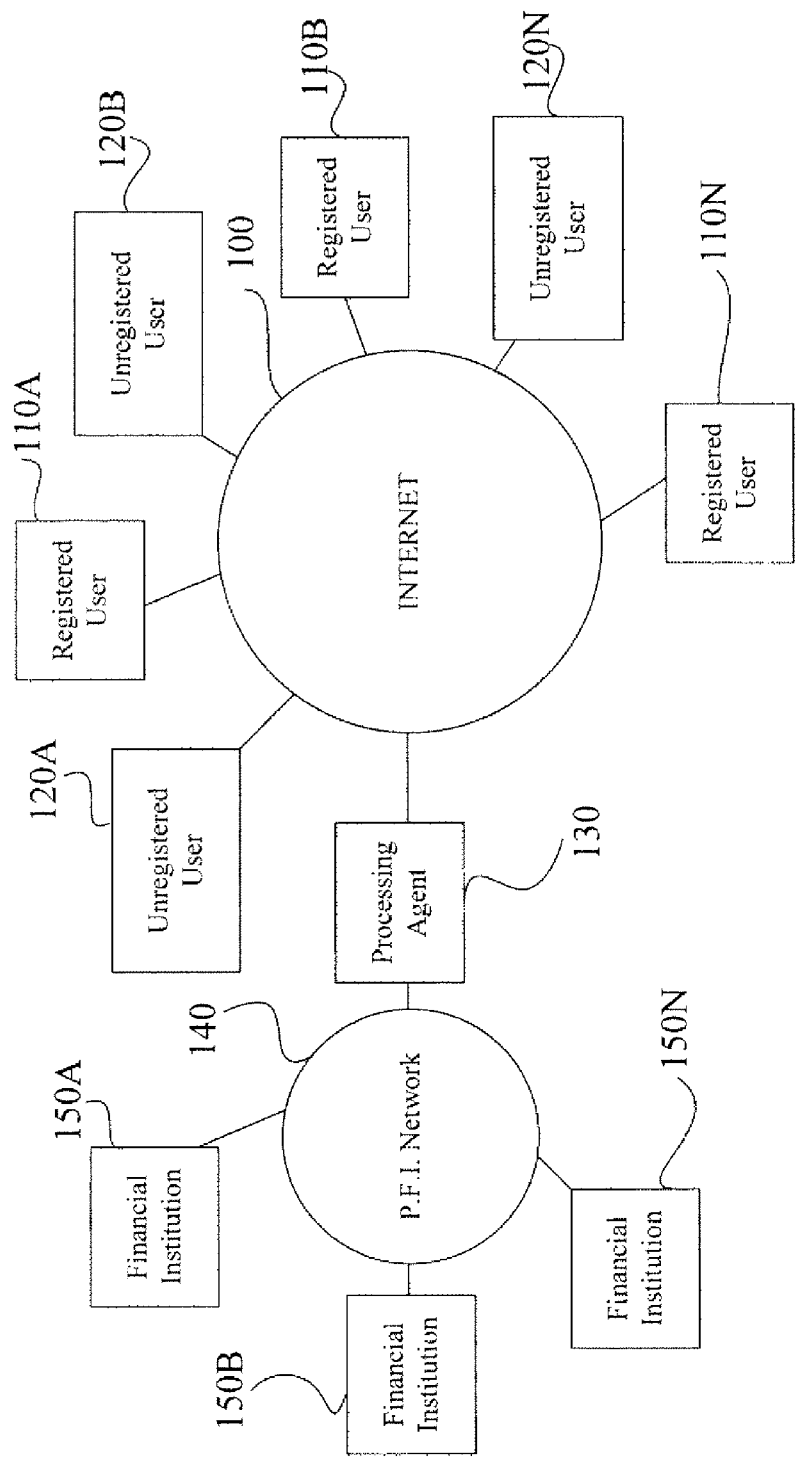
FIG. 1 depicts exemplary networks of the present invention and users of the networks, including a processing agent, registered users, unregistered users, and financial institutions.

As shown in FIG. 1, Internet 100 interconnects multiple registered users 110A, 110B . . . 110N, multiple unregistered users 120A, 120B . . . 120N and a processing agent 130. The Internet 100 is shown to be the Internet, but it could be virtually any type of network. Internet 100 could also be multiple interconnected networks. Also shown is a P.F.I. network 140 interconnecting processing agent 130 and multiple financial institutes 150A, 150B . . . 150N, each financial institute is associated with at least one of the registered users 110A, 110B . . . 110N, unregistered users 120A, 120B . . . 120N, or processing agent 130. The P.F.I. network 140 is shown to be a private financial institute network, such as the currently existing bank network over which it is quiet common to electronically transfer funds between banks. Here again, the P.F.I. network 140 could be another type of network interconnecting the processing agent 130 to financial institutes 150A, 150B . . . 150N. Also, P.F.I. network 140 could be multiple interconnected networks. It should be understood that a user, registered or unregistered, may be either an individual, a business, or other organization. The processing agent 130 performs as a payment service provider, receiving requests from registered users to make payments on behalf of the registered users. The processing agent 130 executes the payments as will be described below.

Each of the registered users 110A, 110B . . . 110N and unregistered users 120A, 120B . . . 120N is preferably represented on the Internet 100 by a computer of the type depicted in FIGS. 2 and 3, which will be described further below. However, it should be recognized that virtually any network device could be utilized so long as the device has sufficient processing and communication capabilities to function in the described manner. The term "network device" includes personal digital assistants (PDA's), telephones, including cellular and/or digital telephones, and set-top boxes, among other devices. It will also be understood that a network device may connect to a network via wireless communications.

Figure 2:
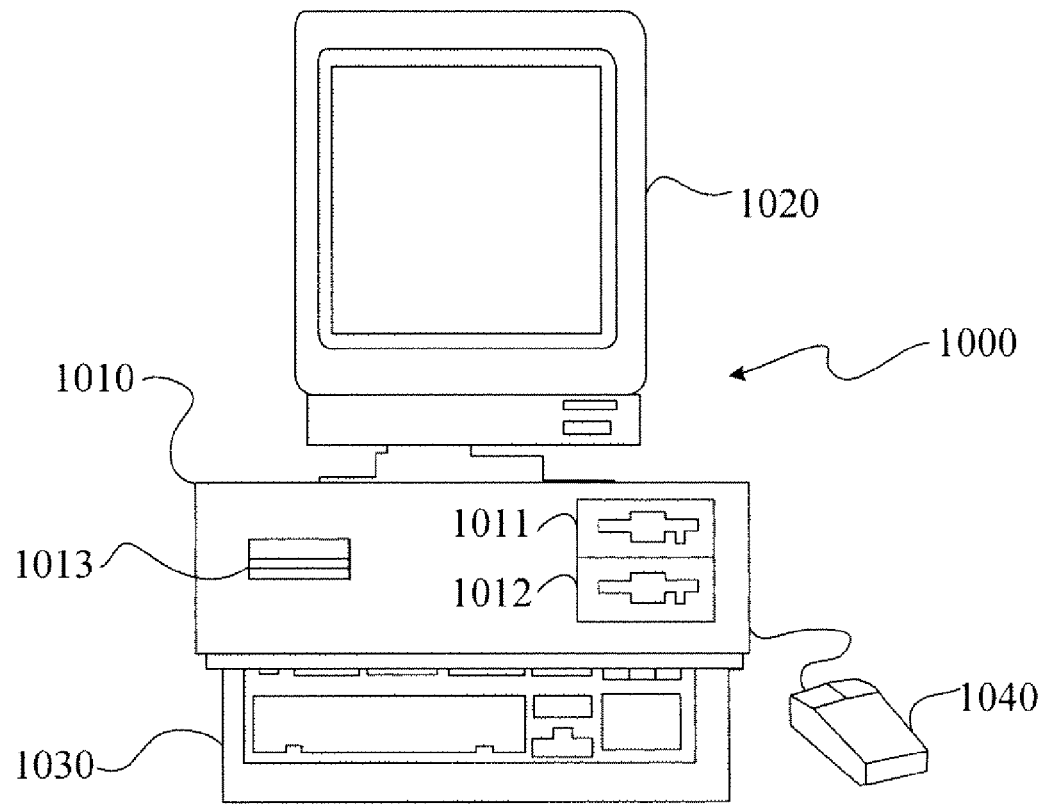
FIG. 2 depicts a computer suitable for use by a registered user to access a network in accordance with the invention.
Figure 3:
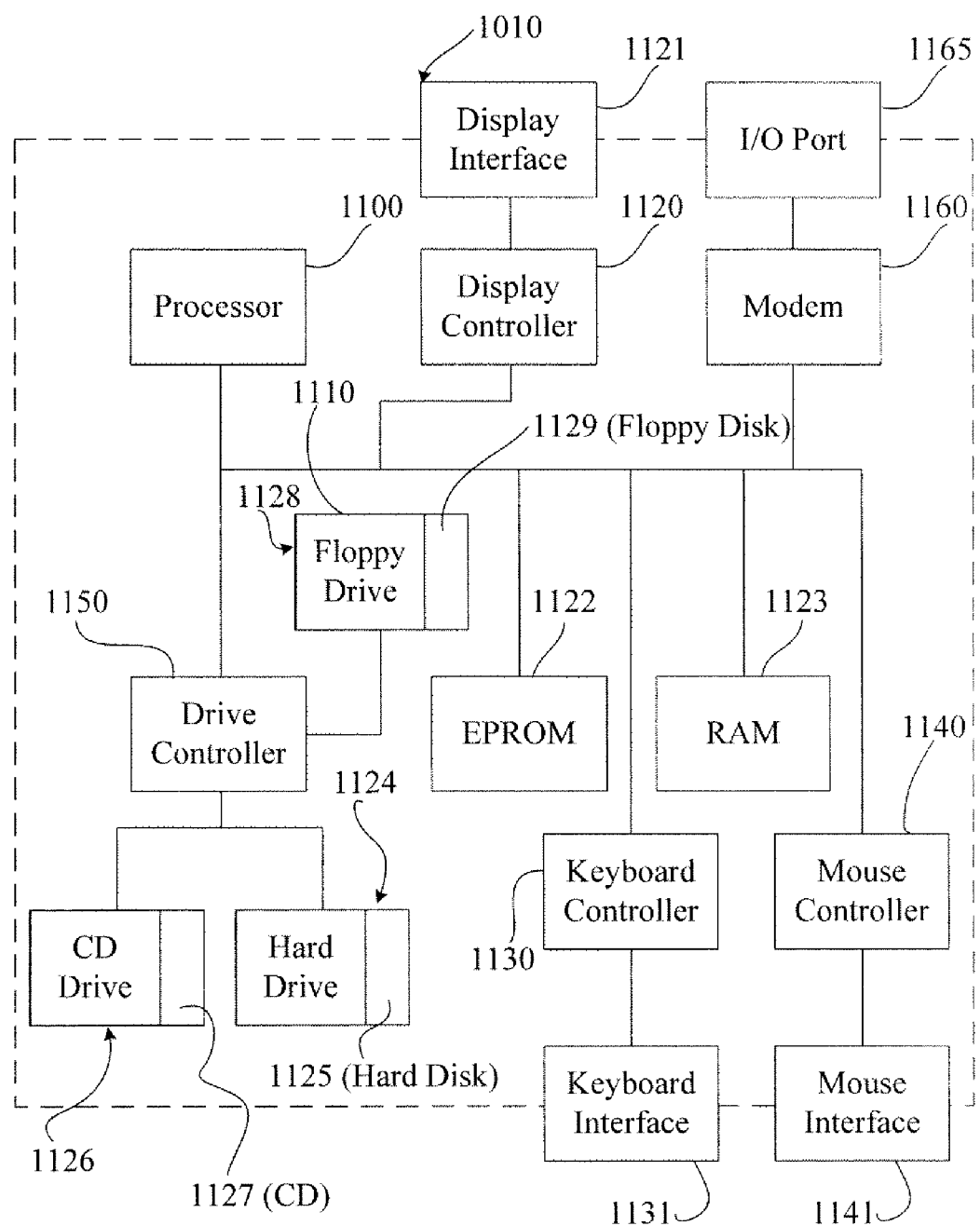
FIG. 3 is an exemplary block diagram of components of the computer depicted in FIG. 2.

FIGS. 2 and 3 depict an exemplary personal computer suitable for use by users, registered or unregistered, to access the Internet 100 in the below-described invention. The computer is preferably a commercially available personal computer. It will be recognized that the computer configuration is exemplary in that other components (not shown) could be added or substituted for those depicted and certain of the depicted components could be eliminated if desired.

The computer functions in accordance with stored programming instructions which drive its operation. Preferably, the computer stores its unique programming instructions on an EPROM, or hard disk. It will be recognized that only routine programming is required to implement the instructions required to drive the computer to operate in accordance with the invention, as described below. Further, since the computer components and configuration are conventional, routine operations performed by depicted components will generally not be described, such operations being well understood in the art.

Referring to FIG. 2, the computer 1000 includes a main unit 1010 with slots 1011, 1012, and 1013, respectively provided for loading programming or data from a floppy disk, compact disk (CD), hard disk, and/or other storage means, onto the computer 1000. The computer 1000 also includes a keyboard 1030 and mouse 1040 which serve as user input devices. A display monitor 1020 is also provided to visually communicate information to the user.

As depicted in FIG. 3, the computer 1000 has a main processor 1100 which is interconnected via bus 1110 with various storage devices including EPROM 1122, RAM 1123, hard drive 1124, which has an associated hard disk 1125, CD drive 1126, which has an associated CD 1127, and floppy drive 1128, which has an associated floppy disk 1129. The memories, disks and CD all serve as storage media on which computer programming or data can be stored for access by the processor 1100. A drive controller 1150 controls the hard drive 1124, CD drive 1126 and floppy drive 1128. Also depicted in FIG. 3 is a display controller 1120 interconnected to display interface 1121, a keyboard controller 1130 interconnected to keyboard interface 1131, a mouse controller 1140 interconnected to mouse interface 1141 and a modem 1160 interconnected to I/O port 1165, all of which are connected to the bus 1110. The modem 1160 and interconnected I/O port 1165 are used to transmit and receive signals via the Network Internet 100 as described below. It will be understood that other components may be connected if desired to the bus 1110, including communications components other than a modem. By accessing the stored computer programming, the processor 1100 is driven to operate in accordance with the present invention.

Processing agent 130 is preferably represented on networks 100 and 140 by a network server of the applicable type shown in FIGS. 4 and 5, as will be described further below. However, here again, any network compatible device which is capable of functioning in the described manner could be substituted for the servers shown in FIGS. 4 and 5.

Figure 4:
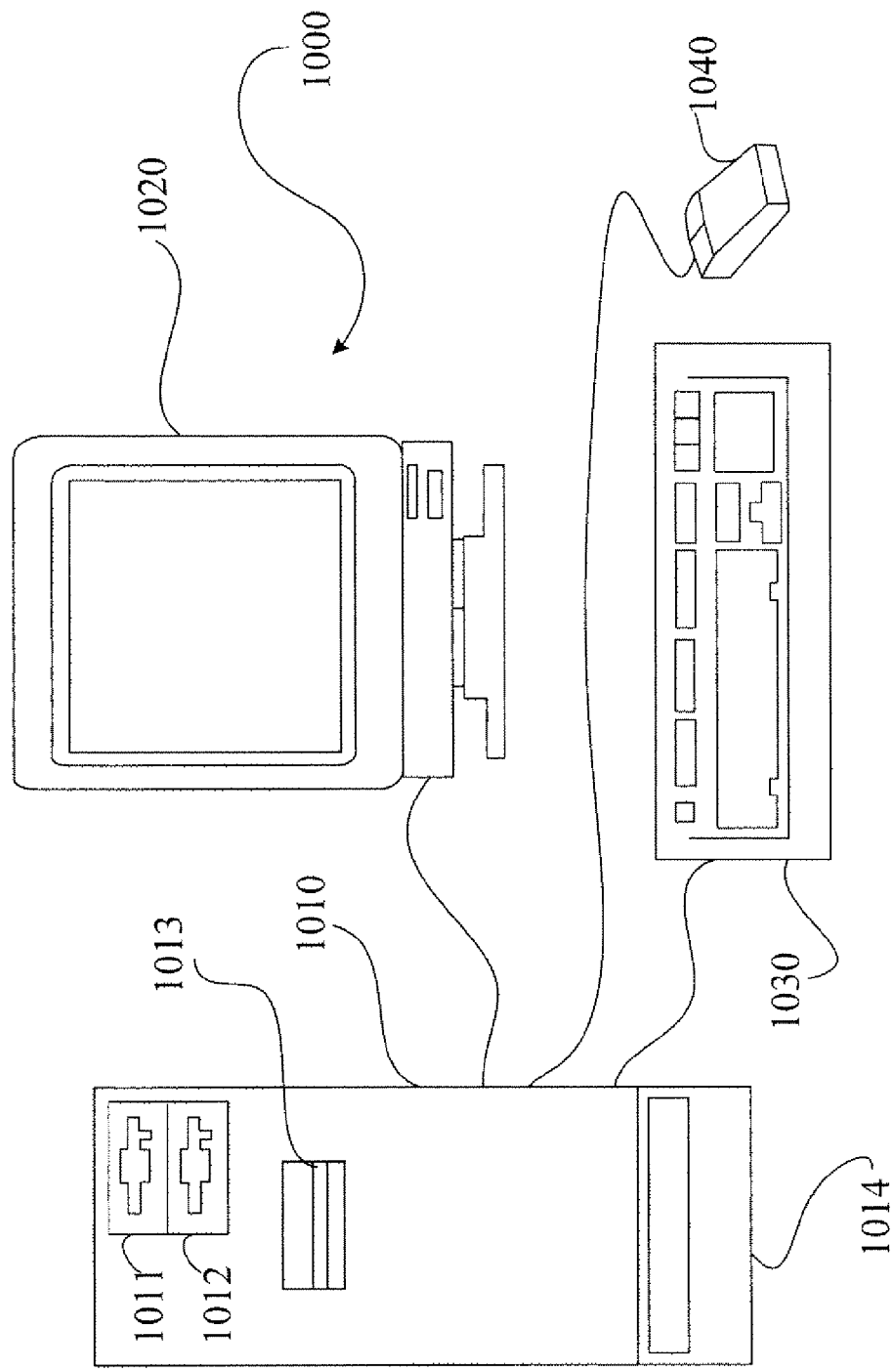
FIG. 4 depicts a server suitable for use by the processing agent in accordance with the present invention.
Figure 5:
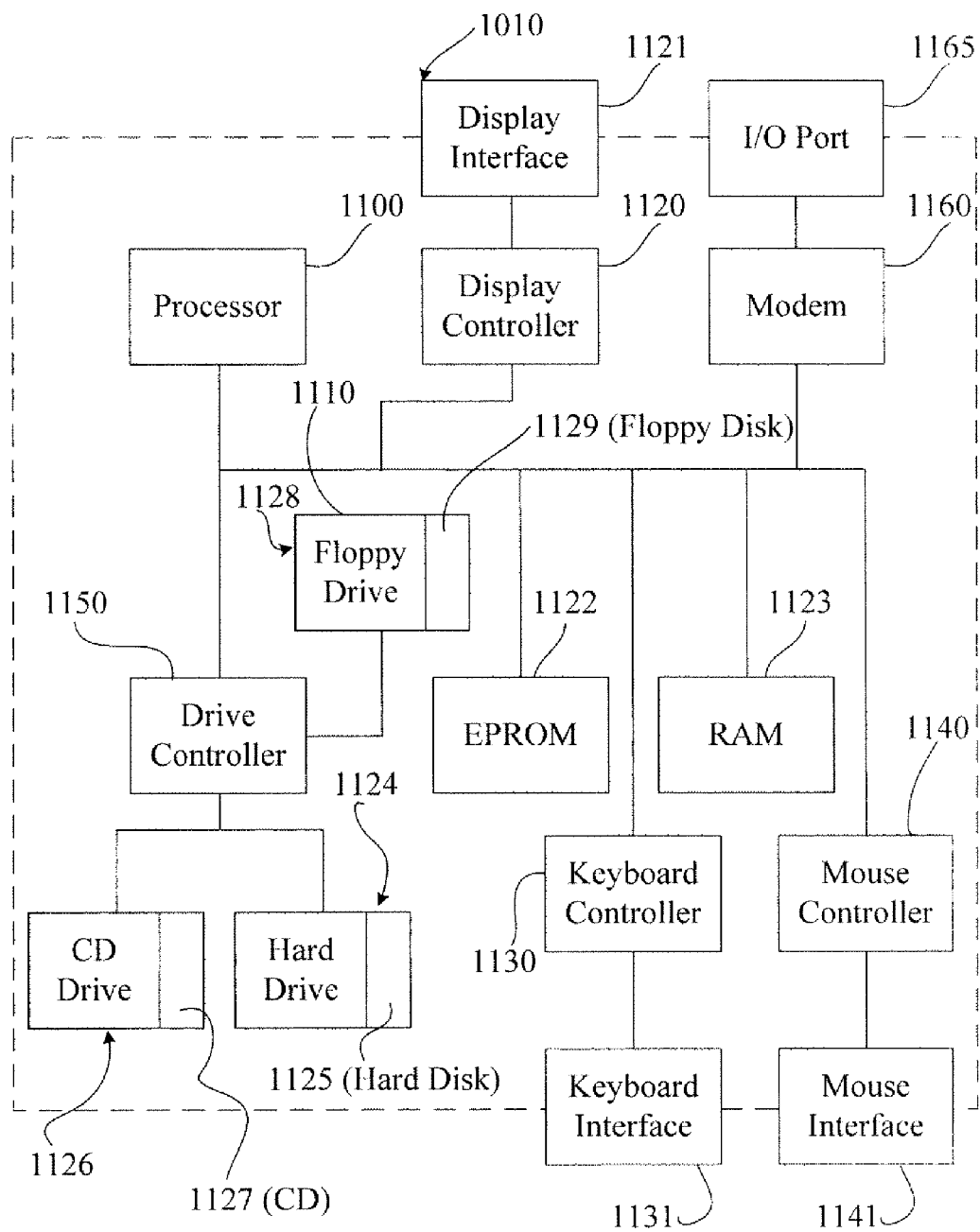
FIG. 5 is an exemplary block diagram of components of the server depicted in FIG. 4.

FIGS. 4 and 5 depict an exemplary network server, referring to FIG. 1, suitable for use by the processing agent 130 to access networks, such as the P.F.I. network and Internet, 100 and 140 in the below-described invention. The server is preferably a commercially available high power, or mainframe computer. Here again, it will be recognized that the server configuration is exemplary in that other components (not shown) could be added or substituted for those depicted and certain of the depicted components could be eliminated if desired.

The server functions as described below in accordance with stored programming instructions which drive its operation. Preferably, the server stores its unique programming instructions on an EPROM or hard disk. It will be recognized that only routine programming is required to implement the instructions required to drive the server to operate in accordance with the invention, as described below. Further, since the server components and configuration are conventional, routine operations performed by depicted components will generally not be described, such operations being well understood in the art.

Referring to FIG. 4, the server 1000' includes a main unit 1010' with slots 1011', 1012', 1013' and 1014', respectively provided for loading programming or data from a floppy disk, CD, hard disk, and/or other storage means onto the server 1000'. The server 1000' also includes a keyboard 1030' and mouse 1040', which serve as user input devices. A display monitor 1020' is also provided to visually communicate information to the user.

As depicted in FIG. 5, the main unit 1010' has a main processor 1100' which is interconnected via bus 1110' with various storage devices including EPROM 1122', RAM 1123', hard drive 1124', which has an associated hard disk 1125', CD drive 1126', which has an associated CD 1127', and floppy drive 1128', which has an associated floppy disk 1129'. The memories, disks and CD all serve as storage media on which computer programming or data can be stored for access by the processor 1100'. The stored data includes one or more databases containing information associated with registered users 120A-120N and transactions associated with registered users 120A-120N. The memories associated with the server hereafter will be collectively referred to as memory 1170. A drive controller 1150' controls the hard drive 1124', CD drive 1126' and floppy drive 1128'. Also depicted in FIG. 5 is a display controller 1120' interconnected to display interface 1121', a keyboard controller 1130' interconnected to keyboard interface 1131', a mouse controller 1140' interconnected to mouse interface 1141' and a modem 1160' interconnected to I/O port 1165', all of which are connected to the bus 1110'. The modem 1160' and interconnected I/O port 1165' are used to transmit and receive signals via the Network 100 as described above. It will be understood that other components may be connected if desired to the bus 1110', including communications components other than a modem. By accessing the stored computer programming, the processor 1100' is driven to operate in accordance with the present invention.

Once registered, a user is enabled to direct the processing agent 130 to make payments on his or her behalf. These payments may be payments of bills received from billers, who also may be registered users. These bills may be paper bills, or may be bills received electronically. These payments may be other types of payments, such as payments for goods or services purchased via the network 100, or gift payments.

If a payee is a registered user, a payment is preferably made in the form of an electronic debit to a registered payer's demand deposit account (DDA) and an electronic credit to the registered payee's DDA. Debits and credits can alternatively be made to accounts other than demand deposit accounts, such as savings accounts, credit accounts and brokerage accounts, among other types of accounts. Though, preferably, credits are made to a DDA. Also preferably, the electronic debits and electronic credits from and to demand deposit accounts are made via the automated clearinghouse bank network (ACH), though other networks and other electronic means may be used to effect the debits and credits. The debit to the payer's DDA can result in a matching credit to the payee's DDA, or the debit to the payer's DDA can result in a matching credit to the processing agent's 130 DDA. In such case, a separate electronic debit is made against the processing agent's 130 DDA, with a matching credit to the payee's DDA. This may occur previous to, concurrent with, or following the debit to the payer's DDA.

Funds from the payer's account can also be obtained via paper methods, such as by checks or drafts. As well, payments to registered users can also be made via paper methods. If the payee is not a registered user, the payment to the payee will be a paper payment, not electronic. This paper payment may be made to the payee in two ways. In a first way, payment is made by a check drawn on a DDA belonging to the processing agent 130 and payable to the payee. The processing agent obtains funds from the payer's DDA. Preferably, this is done electronically, as discussed above. Or, funds may be obtained from the payer by way of a processing agent 130 prepared draft drawn on the payer's DDA and payable to the processing agent 130. In a second way to make payment to an unregistered payee, payment is made by a draft, prepared by the processing agent 130, drawn on the payer's DDA and payable to the payee.

FIG. 7 is a partial depiction of a database 700 maintained by the processing agent 130 for storing information associated with each registered user. The database includes at least information identifying each registered user 701 and that user's status 702. Identity information can include any or all information required for registration, such as a user name, 701A, as well as a unique identifier assigned to each user by the processing agent 130, 701B, as is shown in FIG. 7. Those registered users whose status is "open" (O) are permitted by the processing agent 130 to direct payments to any payee. Those registered users whose status is "closed" (C) are permitted by the processing agent 130 to direct payments to only certain payees, known as preferred payees and who will be further discussed below. Database 700 also may store additional information. As depicted in exemplary FIG. 7, this information can include any or all of, but is not limited to, information indicating the date upon which each user registers 703, information indicating the number of payments each user has directed 704, and the number of those payments which have resulted in a debit to the payer not being initially honored 705. Upon a user becoming registered, information associated with that user is added to database 700. As that user directs payments, the above-described information is added to database 700, associated with that user.

Figure 8:
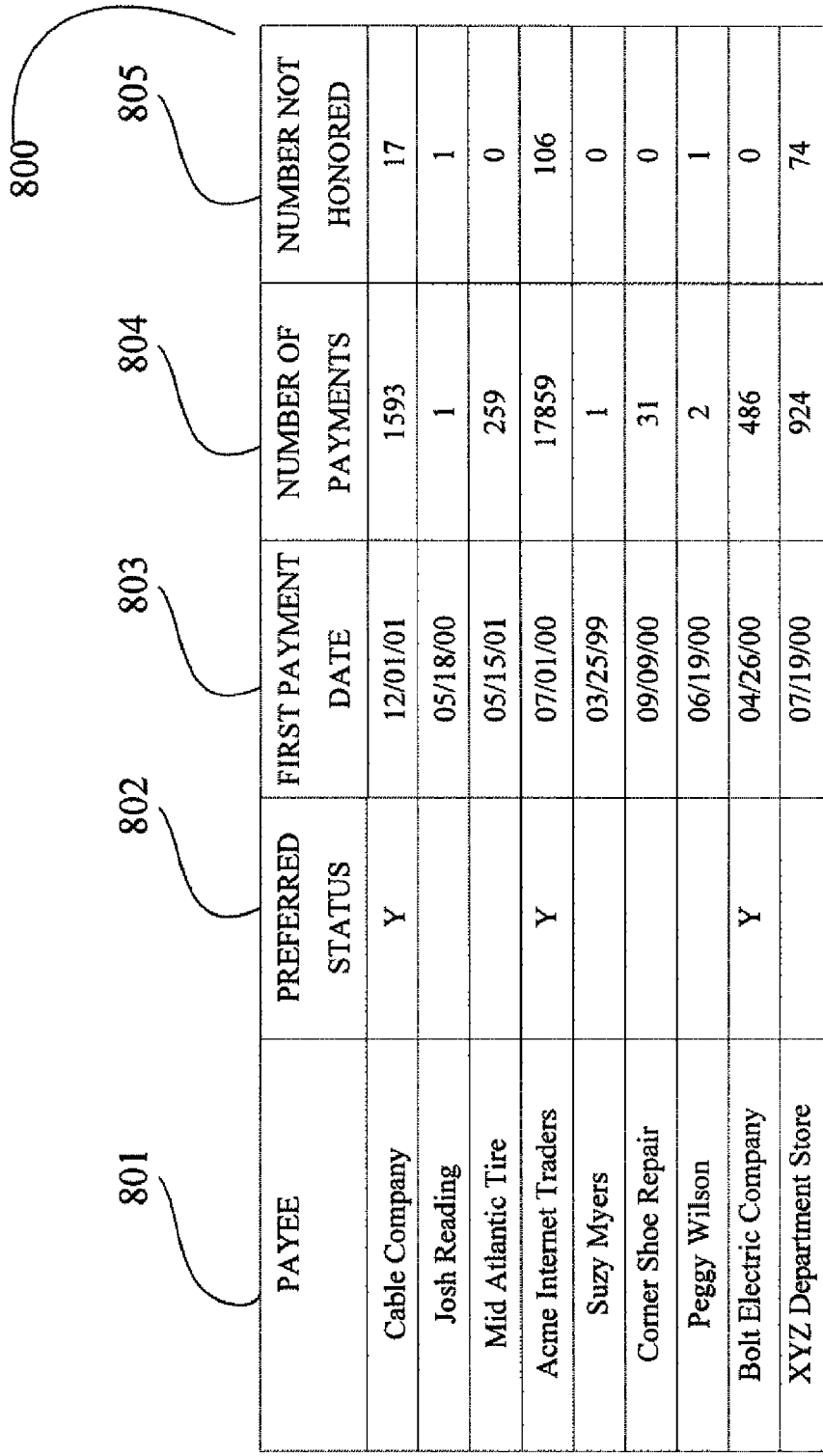
FIG. 8 is an exemplary depiction of a payee database in accordance with the present invention.

FIG. 8 is a partial depiction of a database 800 maintained by the processing agent 130 for storing information associated with payees. Payees included in database 800 include preferred payees as well as all payees to whom registered payers have directed payments be made. This database includes at least information identifying each payee 801 and an indication of status as a preferred payee 802. Identifying information can include a name, address, and/or other identifying information, such as a unique identifier assigned to the payee by the processing agent 130. Database 800 may also include other information related to each payee. As depicted in exemplary FIG. 8, the information can include any or all of, but is not limited to, information indicating the date upon which a payment was first directed to each payee 803, the number of payments which have been directed to each payee 804, as well as the number of those payments which have resulted in a debit to the payer not being initially honored 805. As a payment is made to a payee on behalf of a registered user, information associated with that payment is added to database 800. This includes adding the payee to database 800 if the payee is not already included.

To direct the processing agent 130 to make payments, a user must register. Once a user registers, that user can direct the processing agent 130 to make payments on his or her behalf. Introduced above, a registered user can either have the status of an "open" user, or a "closed" user. The processing to register a user as an "open" user is different than that to register a user an a "closed" user. Furthermore, "closed" and "open" registration processing can be mixed. Thus, the processing agent 130 can operate in multiple registration modes. This ability allows the processor to offer several registration options. In a first option, an unregistered user seeking registration could seek "closed" registration, resulting in the status of a "closed" user. In a second option, an unregistered user seeking registration could seek "open" registration, resulting in the status of an "open" user. In a third option, the processing agent 130 could offer "closed" registration status for free, or for a reduced fee compared to "open" registration status, while "open" registration 115 status is offered for a fee, or for an increased fee over "closed" registration status. This option is especially beneficial in increasing the number of registered users. In a fourth option, "closed" registration status could be offered to a user for free depending upon a relationship that user maintains with a sponsor, who will be further discussed below. In a fifth option, an unregistered user seeking "open" registration status may not meet one or more financial risk criterion necessary to obtain "open" status, and as a result that "risky" user could be offered "closed" status in place of "open" status. Thereinafter, based upon that user's transaction history, or other factors, his or her registration status could be changed to "open". In yet a sixth option, a registering user could initially be registered as a "closed" user in a real-time registration process, and thereinafter, could be further registered as an "open" user in a non-real-time registration process. Different ones of these options could be presented to different registering users, or could be utilized depending upon different circumstances.

Figure 9:
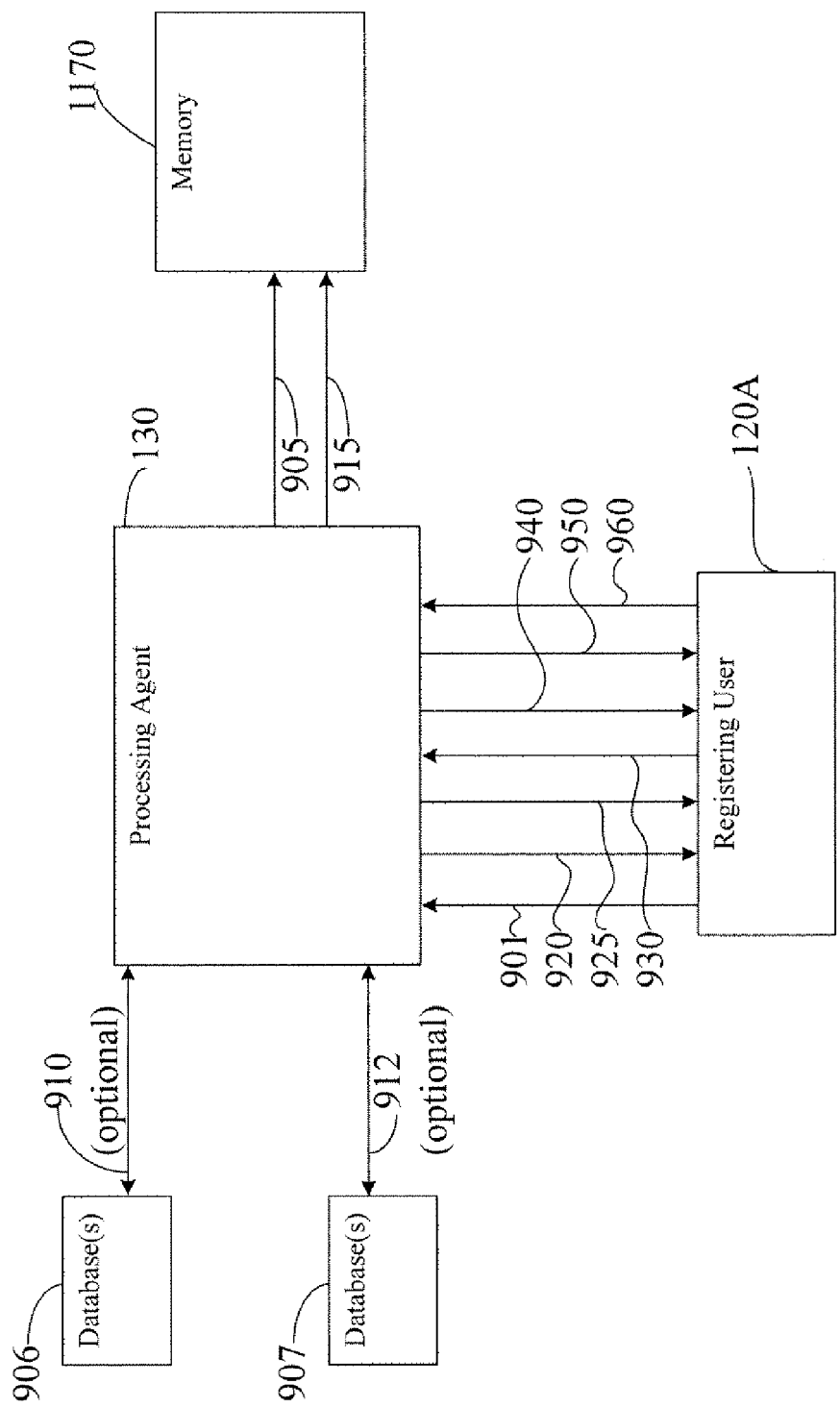
FIG. 9 depicts communications between the processing agent and a registering user to register the user as a "closed" user in accordance with the present invention.

The communications for, and steps of, the registration process for registering user 120A as a "closed" user are depicted in FIGS. 9 and 10A-10D. As described below, in this and in each registration scenario described herein, the registering user 120A identifies a single DDA during the registration process, though it will be understood that the registering user 120A may identify an account other than a DDA, such as a credit account. As shown in FIG. 9, registering user 120A contacts the processing agent 130 on-line via communication 901. The registering user 120A transmits, via the Network 100, at least information identifying the registering user 120A, an account number of a demand deposit account (DDA) belonging to the registering user 120A, and information identifying the financial institution at which the DDA is maintained, step 201 of FIG. 10A. This information may be submitted via an enrollment form transmitted to the registering user 120A by the processing agent 130 via the Network 100. The registration information is received by the processing agent 130 via the network 100, as shown in step 202.

Optionally, processing agent 130 can accept more than one account from which to electronically debit and/or to which to electronically credit, no matter the type registration processing (open or closed) being performed. In such a case, registering user 120A submits information identifying two or more accounts and the associated financial institutions. It should be understood that whenever a registered user has identified more than one account, the registered user may identify the account from which funds are to be debited on a per transaction basis, the registered user may identify a single account from which all debits are to be made, or the registered user may identify a particular account from which debits for payments to a specified payee are to be made. When receiving funds from other registered users, the registered user may identify the account to which funds are to be credited on a per transaction basis, the registered user may identify a single account to which all credits are to be made, or the registered user may identify an account to which credits from a particular source are to be made. Furthermore, a registered user may identify a single account from which all debits are to be made, and a different single account to which all credits are to be made.

The registering user 120A may be a registered user of another type service provider, such as an on-line auction site, a financial institution, an Internet portal site, an on-line electronic greeting card service, or an on-line merchant. The other service provider could present to its members an opportunity to become a registered user of the processing agent 130. These other service providers are known as sponsors. If a member of another service chooses to become a registered user of the processing agent 130 from an option presented by a sponsor, the sponsor can pre-populate an enrollment form with any data that is already maintained by the sponsor and that is also required to register with the processing agent 130. The registering user 120A completes the enrollment faint, if necessary, and transmits it to processing agent 130. From this point forward, registration via a sponsor is the same as registration not via a sponsor.

In another alternative, a sponsor may interact with the processing agent 130 to register a registering user. That is, the sponsor presents to the processing agent 130 any required information to register the registering user. In this alternative, the registering user need not perform any communications with the processing agent 130 to become registered.

Returning to FIGS. 9 and 10A, at step 203, the processing agent 130 verifies, in real-time, that required registration information has been provided, and then stores the received information in memory 1170 via communication 905. If all required information has been provided, processing could continue with step 206, or either or both of the following operations could be performed in real-time. At optional step 204, the processing agent validates the information identifying the registering user 120A received by the processing agent 130. This too is preferably performed in real-time. Required identity information can include a name, social security number, mailing address, city, state, phone numbers, zip code, date of birth, e-mail address, and driver license number, among other information associated with the registering user 120A. If the processing agent 130 determines that the information identifying the registering user 120A is valid, processing could continue with step 206, or with step 205.

The identity validation process can include accessing one or more databases 906, via communication 910 containing identity information to determine if the received identity information corresponds with that in the database(s) 906. As shown in FIG. 9, database(s) 906 is not stored in memory 1170. However, it will be understood that database(s) 906 may be stored in memory 1170.

At optional step 205 the processing agent 130 validates the received DDA number and the information identifying the associated financial institution. If the information identifying the DDA and the financial institution is validated, processing continues as depicted in step 206. This too is preferably performed in real-time.

The DDA number/financial institution processing can include accessing one or more databases 907, via communication 912, containing information associated with demand deposit accounts and financial institutions to validate the received DDA/financial institution information. As shown in FIG. 9, database(s) 907 is not stored in memory 1170. However, it will be understood that database(s) 907 may be stored in memory 1170.

It should be understood that optional steps 204 and 205 could be executed essentially concurrently, or step 205 could precede step 204. Furthermore, only one of these steps could be executed in "closed" registration processing. If all required information is submitted, and optionally validated, the processing agent 130 generates and stores in memory 1170 a user ID and password for the registering user 120A, communication 915 and step 206. The totality of the registration information, the user ID, and the password can also or alternatively be stored in database 700. Alternatively, only a portion of this information could be stored in database 700. For those users registering from another service, an indicator of the service from which the registering user is registering is also preferably stored. Database 700, as well as database 800, could reside in memory 1170, or could reside elsewhere. Optionally, the registering user 120A may select the user identifier and/or password. At step 207, the processing agent 130 transmits a notice of completed registration, the user ID, and password to the now registered user via communication 920, shown in FIG. 9. The registering user 120A can now direct the processing agent 130 to make payments on his or her behalf, albeit only to preferred payees. That is, the registering user 120A has become a "closed" registered user.

Figure 10A:
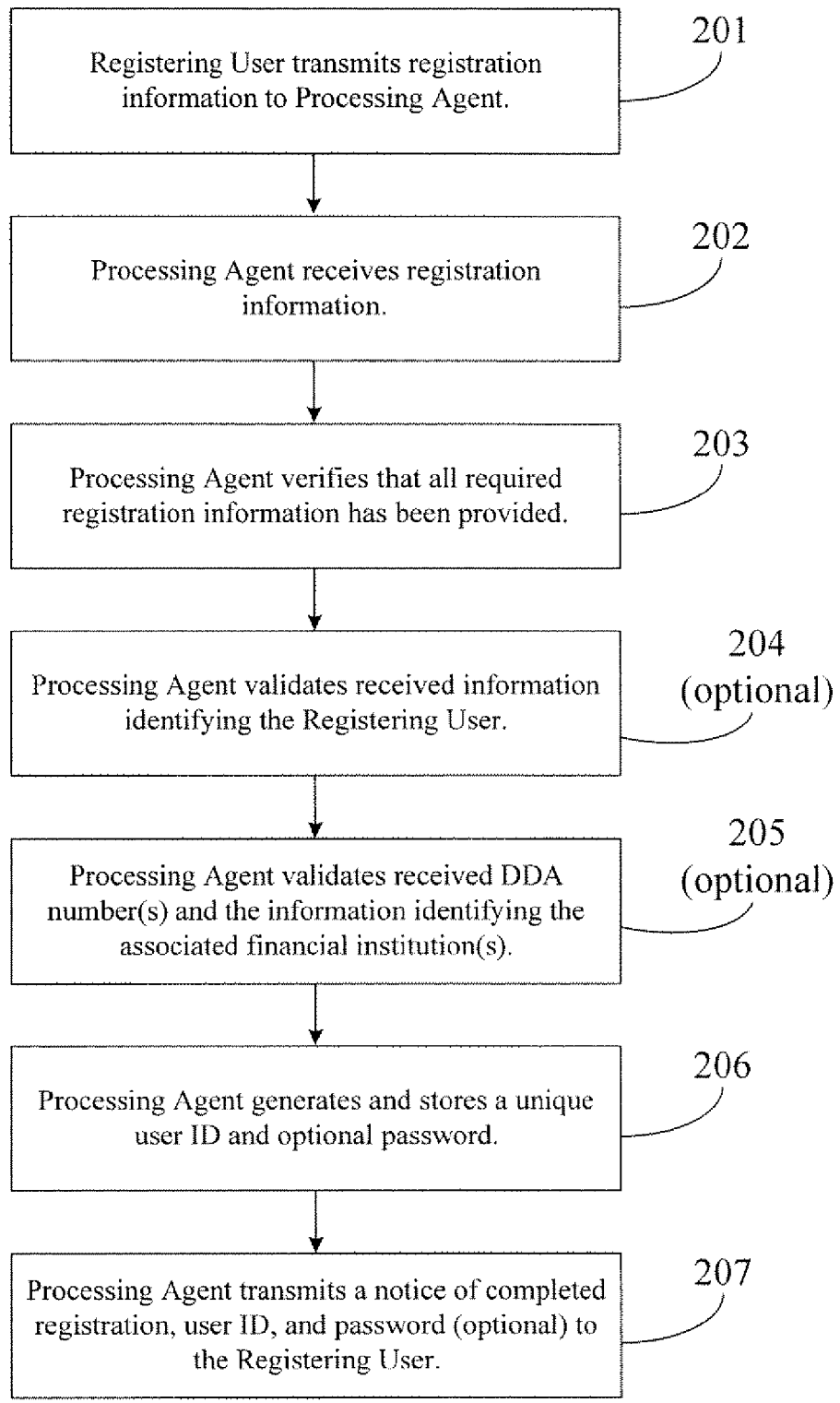
FIGS. 10A-D are flow charts showing operations which are performed in registering the user as a "closed" user in accordance with the present invention.
Figure 10B:
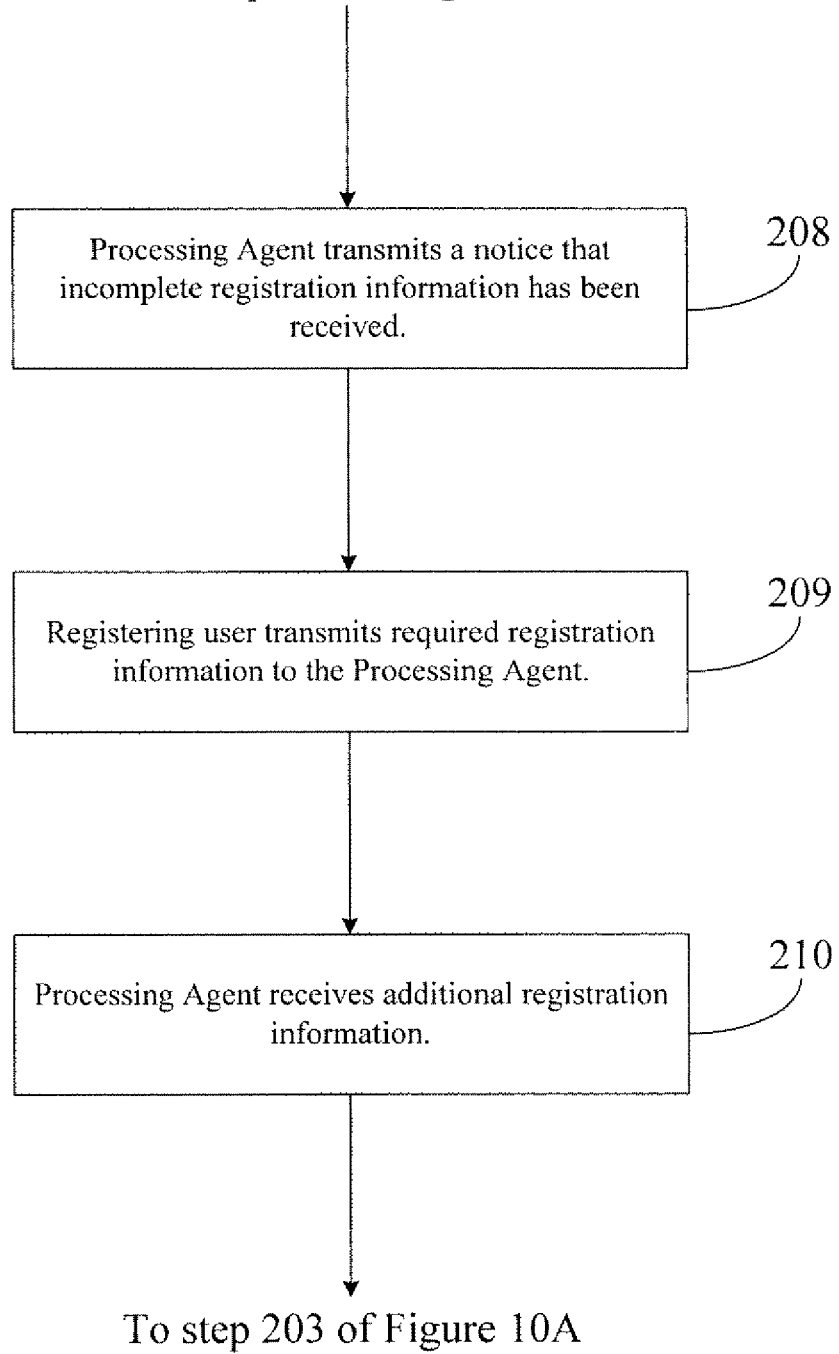

If incomplete registration information has been provided to the processing agent 130, following step 203, at step 208 of FIG. 10B, the processing agent 130 transmits a notice to the registering user 120A, or sponsor if applicable, that incomplete registration information has been received, communication 925. This notice could include an indication of the missing information. If the registering user 120A, or sponsor, chooses, at step 209 additional registration information is transmitted to the processing agent, communication 930. This information is received by the processing agent 130, step 210, and operations continue with step 203.

Figure 10C:
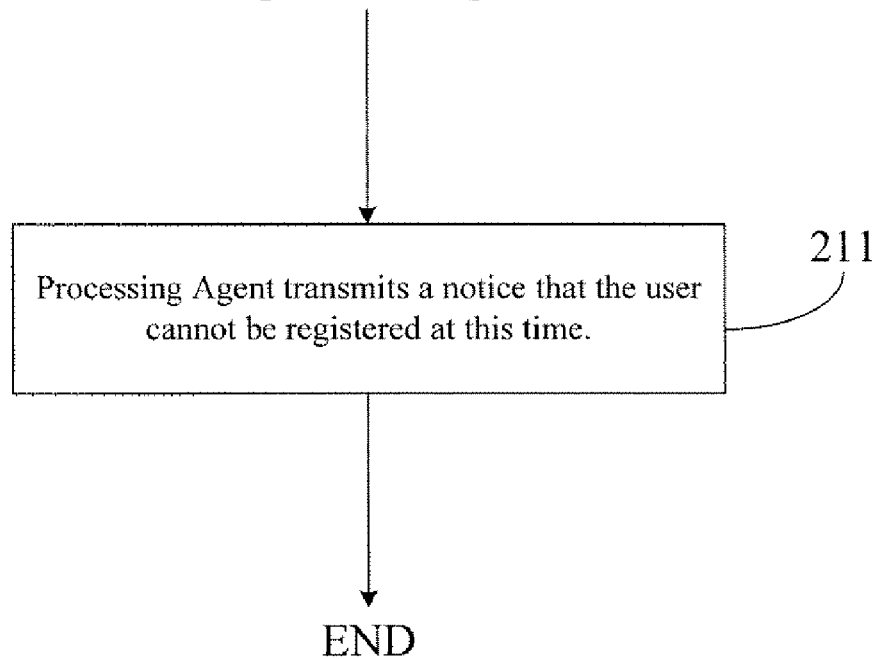

In optional real-time identity processing, if the processing agent 130 cannot validate the identity information, the registering user 120A is informed in real-time, via communication 940, that the processing agent 130 is unable to register the user, as depicted in step 211 of FIG. 10C. The communication also informs the registering user 120A that the registering user 120A should provide the processing agent 130, via traditional postal delivery, a voided check drawn on the user's DDA, along with the information identifying the registering user 120A and the DDA and financial institution information to process the registration in non-real-time. Additionally, the information requested from the registering user 120A may also include additional information identifying the registering user 120A not required for the on-line registration process.

Figure 10D:
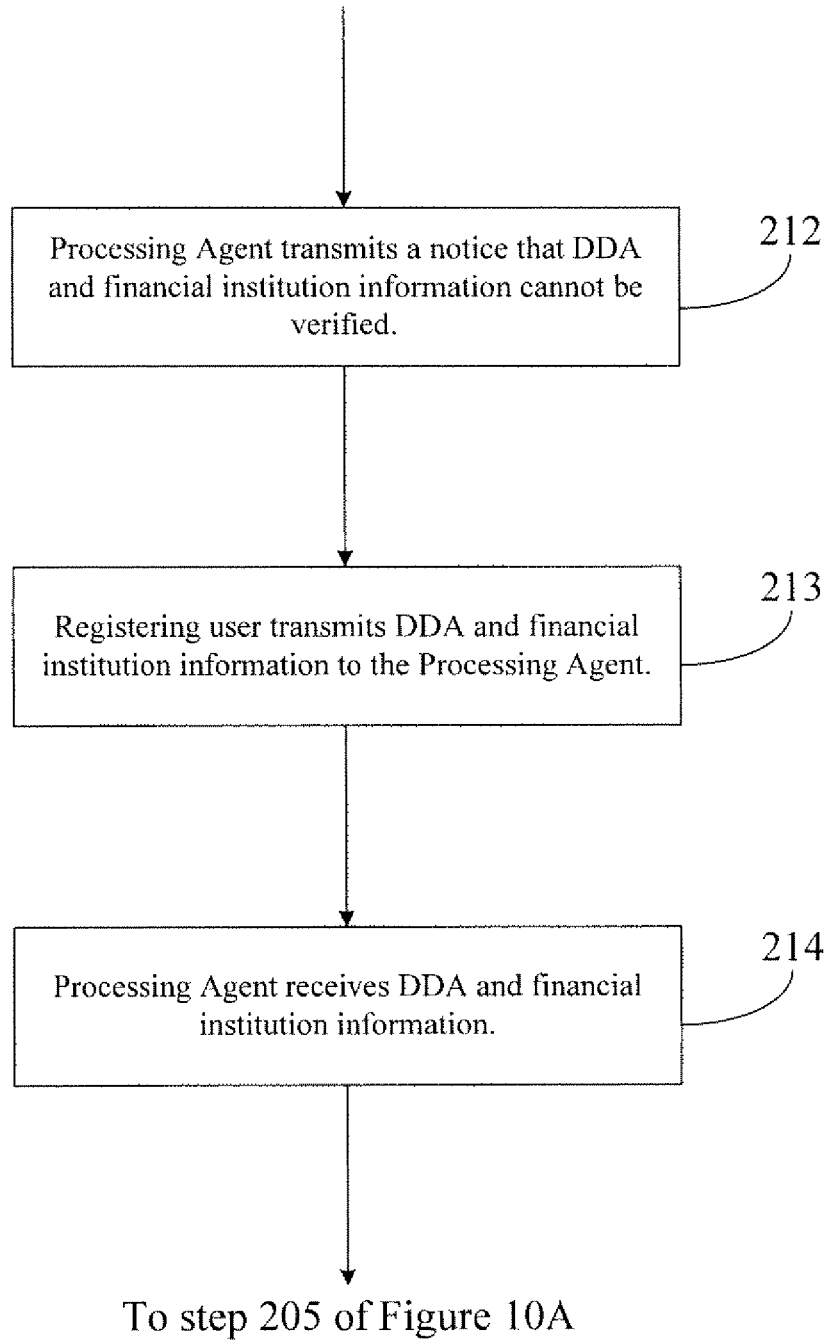

In optional real-time DDA/financial institution processing, if the processing agent 130 cannot validate the DDA and financial institution information at step 205, the registering user 120A is informed in real-time, via communication 950 that the DDA and financial institution information cannot be validated, as depicted in step 212 of FIG. 10D. The registering user 120A is also prompted to reenter the DDA/financial institution information, as a possible reason for validation failure can be improper entry of this information by the registering user 120A. If the registering user 120A reenters and retransmits the required DDA/financial institution information, as depicted in steps 213 and communication 960, the processing agent 130 receives the information, step 214, and validates the newly received DDA/financial institution information as in step 205. If the registering user 120A does not resubmit this information, or if the resubmitted information cannot be validated, registration fails.

Figure 11:
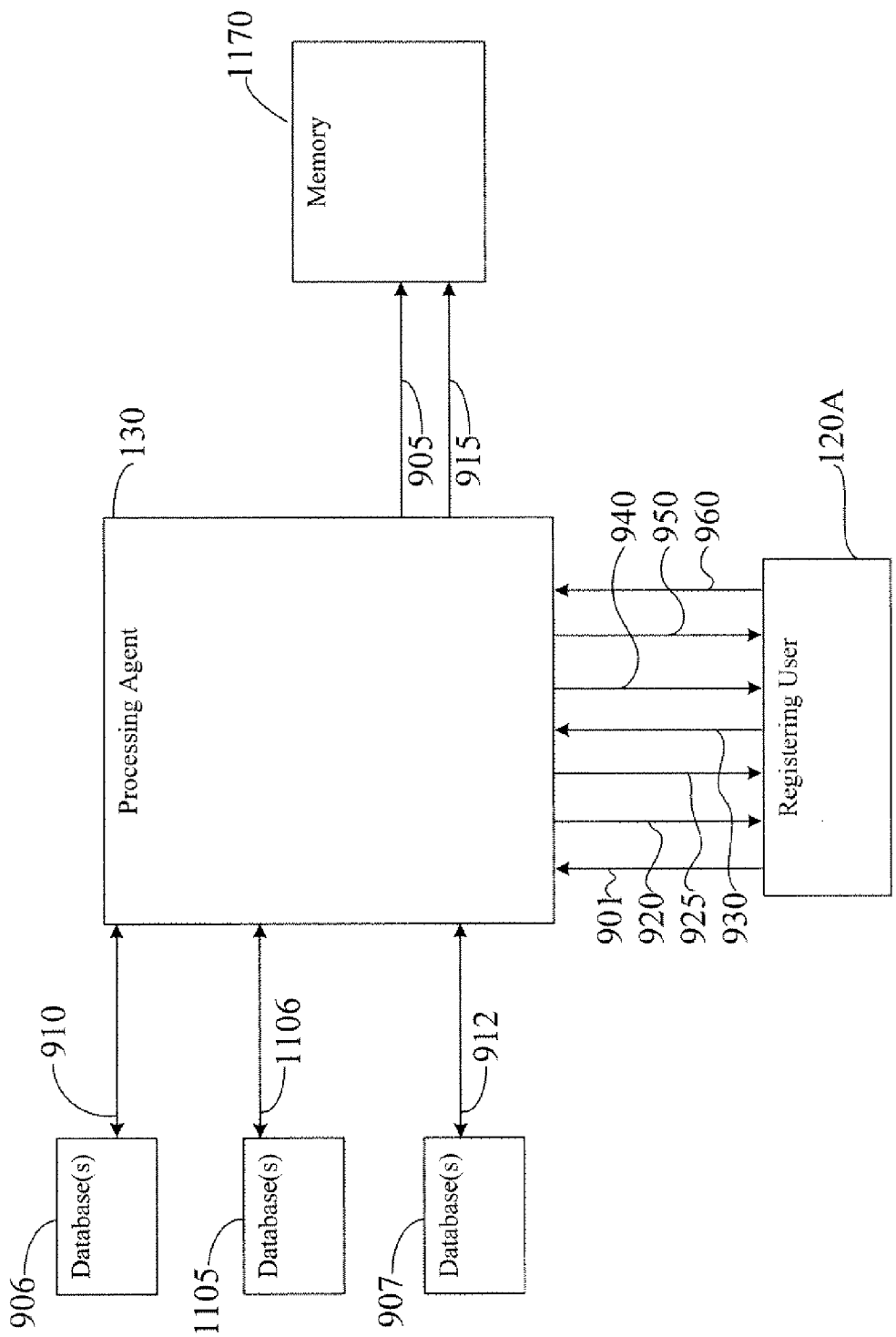
FIG. 11 depicts communications between the processing agent and the registering user to register the user as an "open" user in accordance with the present invention.
Figure 12:
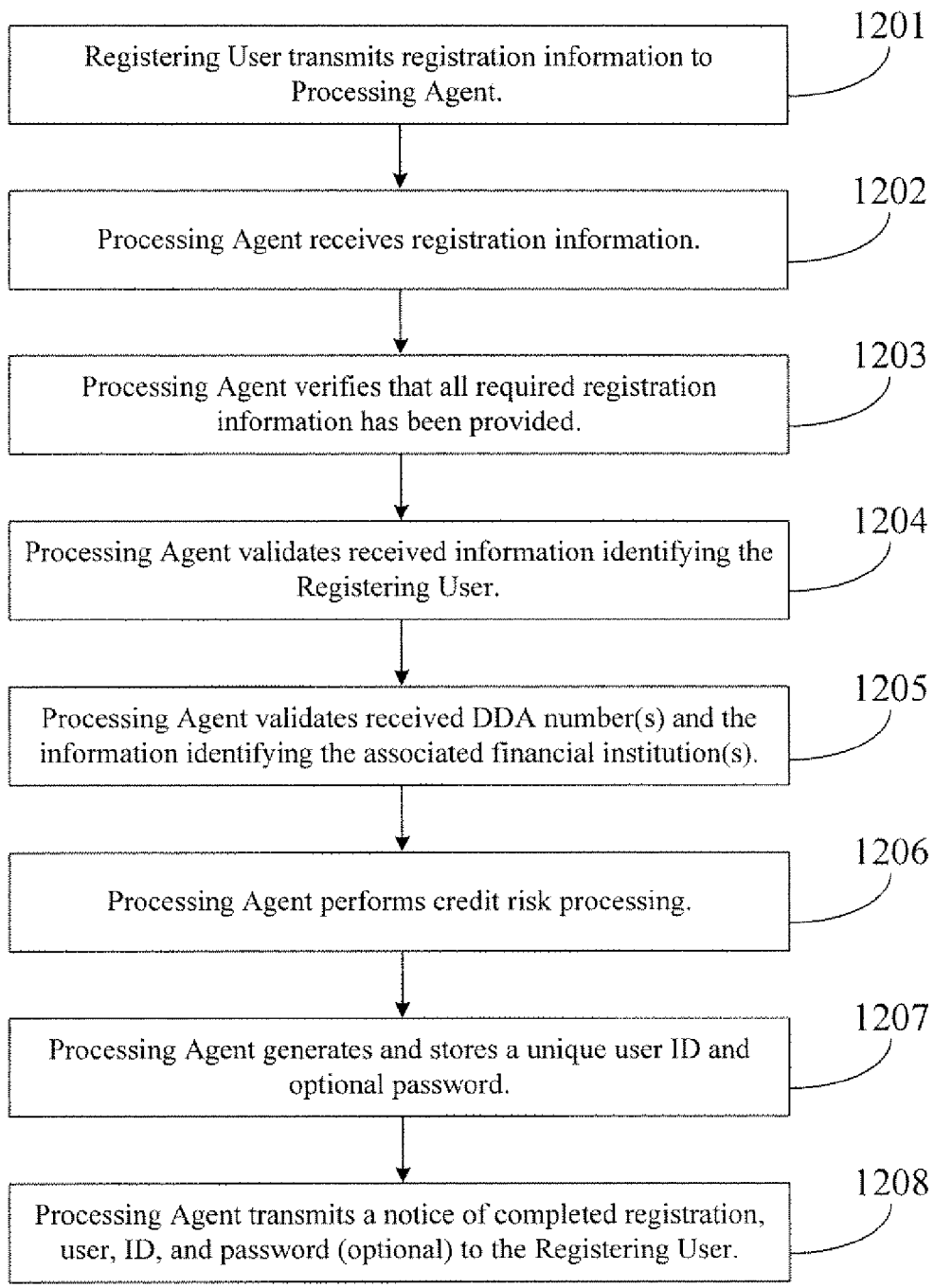
FIG. 12 is a flow chart showing operations which are performed in registering the user as an "open" user in accordance with the present invention.

The communications for, and steps of, the registration process for registering a user as an "open" user are depicted in FIGS. 11 and 12. Preferably, the operations for "open" registration are the same as "closed" registration through step 205 of FIG. 10A, except that optional processing in "closed" registration becomes mandatory. Thereinafter, the "closed" registration processing diverges from the "open" registration processing. However, only a portion of the optional operations in "closed" registration may be made mandatory. FIGS. 11 and 12 depict these optional operations as becoming mandatory. It should also be understood that the operations described below for "open" registration could also be utilized in "closed" registration processing. In particular, credit risk processing could be utilized in "closed" registration.

In real-time "open" registration processing, the processing agent 130 makes further determinations relating to the registering user 120A in step 1201 of FIG. 12. They may be made concurrent with the above-described processing of steps 204 and 205, or they may follow, as is depicted in FIG. 12. Additionally, though these determinations are shown following steps 204 and 205, they may precede these steps, or be made between these steps. These determinations concern credit risks the processing agent 130 will assume in providing the above-described payment service. Credit risk processing can include any or all of: evaluating the credit history of the registering user 120A, identification of DDA closures in the registering user's name, and retrieval of bad check history relating to the registering user 120A.

In this processing, the processing agent 130 determines if one or more credit risk parameters associated with the registering user 120A violate one or predetermined parameters. This can include setting one or more thresholds and determining if a determined credit risk parameter violates a threshold. Credit risk processing can include accessing one or more databases 1105, via communication 1106, containing credit related information. As shown in FIG. 11, databases(s) 1105 is not stored in memory 1170. However, it will be understood that databases(s) 1105 may be stored in memory 1170.

If all required information is submitted and validated, and if the credit risk processing does not result in violated credit risk parameters/thresholds, the processing agent, at step 206 of FIG. 12, generates and stores in memory 1170 a user ID and password for the registering user 120A. As discussed above, all or part of this data may be stored in database 700.

At step 207 of FIG. 12, as above, the processing agent 130 transmits a notice of competed registration, the user ID, and password to the now registered user.

The registering user 120A can now direct the processing agent 130 to make payments on his or her behalf to any payee. That is, the registering user 120A has become an "open" registered user. If the credit risk processing determines that one or more credit risk parameters/thresholds are violated, registering user 120A will be denied the registration status of "open". However, registering user 120A may nonetheless be accepted as a registered user, albeit with the status of "closed". As will be discussed further below, a registered user's status as a "closed" user can later be changed to a status as an "open" user.

In some instances it could be beneficial for the processing agent 130 to perform the credit risk processing in non-real-time. For example, the credit risk processing may be more efficient when performed in a batch mode. No matter the reason credit risk processing is performed in non-real-time, a registering user could be granted the status of "closed" by way of real-time processing, as will be understood from the discussion above, and thereinafter, be granted the status of "open" by way of non-real-time credit risk processing.

In this mixed real-time/non-real-time registration processing, steps 1001, 1005, 1010, 1015, 1017, 1020 and 1025 of FIG. 10A are performed, described above, in real-time. As in "closed" registration processing, optional steps 1015 and 1017 may or may not be performed. The registering user now has the status of "closed". Subsequent to these steps, and in non-real-time, the processing agent 130 performs at least step 1012 described above and depicted in FIG. 12. Assuming that no risk processing parameters/thresholds are violated, the processing agent 130 changes the user's status in database 700 from "closed" to "open" and notifies the user of the change in status. It should also be understood that any of the operations to register a user, either as "closed" or "open" could be performed as a batch process. That is, some or all of the operations could be performed in non-real-time.

Though not shown in FIGS. 9-12, the processing agent 130 may determine if the DDA associated with the registering user 120A can be electronically debited and/or credited during the registration process. This determination is preferably made whenever real-time DDA/financial institution processing is performed. However, it may be made in non-real time, such as after a user has registered, either as "closed" or "open".

A user's status may be changed from "closed" to "open" based upon that user's payment history. As introduced above, database 700 includes information indicating the date upon which each user registers 703, information indicating the number of payments each user has directed 704, and the number of those payments which have resulted in an initial debit to the payer not being honored 705, commonly called an exception. Periodically the processing agent 130 analyzes this information for "closed" registered users to determine if any of those users are eligible for a status change to "open". The analysis can include any one or any combination of these factors. For example, a user's status could be changed based upon the total number of payments that user has directed in relation to the number of those payments which resulted in a debit to the payer's account not being initially honored. Or, status could be changed based upon the length of time that a user has been registered, perhaps in combination with the number of payment directed by that user and/or the number of those payments which resulted in a debit to the payer's account not being initially honored. As above, the user will be notified of a change of status.

A user who fails the credit risk processing could also become an "open" user if in later credit risk processing, parameters/thresholds are not violated. That is, the processing agent 130 could, upon a user's request, or periodically, re-perform credit risk processing for a "closed" user. If the results do not violate parameters, that user's status could be changed to "open".

If "closed" registration status is granted for free, or a reduced fee, a "closed" user could at any time upgrade to "open" status. Also, a user who chooses "closed" registration for any reason could later upgrade to "open" registration. These upgrades in service levels, as will be understood, are dependent upon the results of credit risk processing for a user wishing to upgrade.

It should be noted that the number of preferred payees available to a "closed" user could be a staggered list. That is, the processing agent 130 could offer more than two levels of service. For example, a minimum cost service could offer the narrowest list of preferred payees, while a next higher level service could offer a broader list of preferred payees, and so on. Finally, in full service, a user would have the status of "open".

A registered user may have status as a "closed" user because of a sponsor relationship that user maintains. That is, a sponsor pays for, or otherwise supports, that user's registration. The sponsor may change that level of support to include "open" status. As will be understood from the above discussion, that user would still have to undergo credit risk processing to become an "open" user unless, as discussed below, special agreement exists between a sponsor and the processing agent 130.

Introduced above, the processing agent 130 may be placed at financial risk in making payments on behalf of registered users. This is especially true when payments are made electronically, or otherwise drawn on an account belonging to the processing agent 130. Credit risk processing ameliorates this risk. The dual "open" and "closed" statuses enable users to be accepted as registered users even if they are unable to meet the credit risk processing standards. As discussed above, a user having "open" status can direct payments to any payee, while a user having "closed" status can only direct payments to preferred payees. When payments are made to preferred payees, the processing agent 130 is not placed at financial risk, or is placed at only a reduced financial risk.

A payee can become a preferred payee in at least three ways. A first way is by agreement between the processing agent 130 and the payee. A second way is by agreement between the processing agent 130 and a sponsor. A third way is based upon an analysis of database 800. In the first way, a payee agrees to indemnify the processing agent 130 against any losses the processing agent 130 may incur in making payments to that payee. That is, the payee guarantees to reimburse the processing agent 130 for any debits to payer accounts which are not paid by the payers' financial institutions. Similar to the first way, a sponsor could agree to indemnify the processing agent 130 against any losses the processing agent 130 may incur in making payments to one or more particular payees. This could include only indemnifying payments made to the particular payee or payees by certain registered users.

The third way a payee can become a preferred payee is based upon a history of payments to that payee. Introduced above, database 800 includes, for each payee to whom a payment has been made, the number of payments and the number of those payments which have resulted in an exception. The processing agent 130 periodically analyzes this data to determine which of those payees who are not preferred payees are eligible to become preferred payees. This analysis can include determining if the number of payments made to a particular payee exceeds a given threshold and if the number of those payments resulting in an exception exceeds another threshold. This other threshold may be zero. Thus, a payee who has an excellent record of payments may be granted the status of a "preferred payee" even though that payee does not agree to indemnify the processing agent 130.

It should also be understood that a user's status could be changed from "open" to "closed". That is, a registered user with a history of debits not being initially honored could have his or her status downgraded. Also, further credit risk processing could result in a status downgrade. And, a change in a sponsor agreement could also lead to this downgrade. Likewise, a payee status of "preferred" could also be revoked. This could be due to an ending of an indemnification agreement, or could be based upon the processing discussed above. Thus, a payee that receives payments which result in an excess of exceptions may have "preferred" status revoked. This is especially beneficial in those cases in which that payee has not agreed to indemnify the processing agent 130.

A sponsor may not only agree to indemnify the processing agent 130 from losses associated with payments to certain payees, but may also agree to indemnify the processing agent 130 from losses associated with payments directed by certain registered users. A registered user may have status as an "open" user because of a sponsor relationship that user maintains. Introduced above, an indication of sponsor relationships is stored whenever a user registers, whether registration is direct or made on behalf of the user by a sponsor. A sponsor can agree to indemnify losses associated with certain, or all, registering users who maintain a relationship with the sponsor. In such a case, the registering user will be assigned the status of "open".

Figure 13:
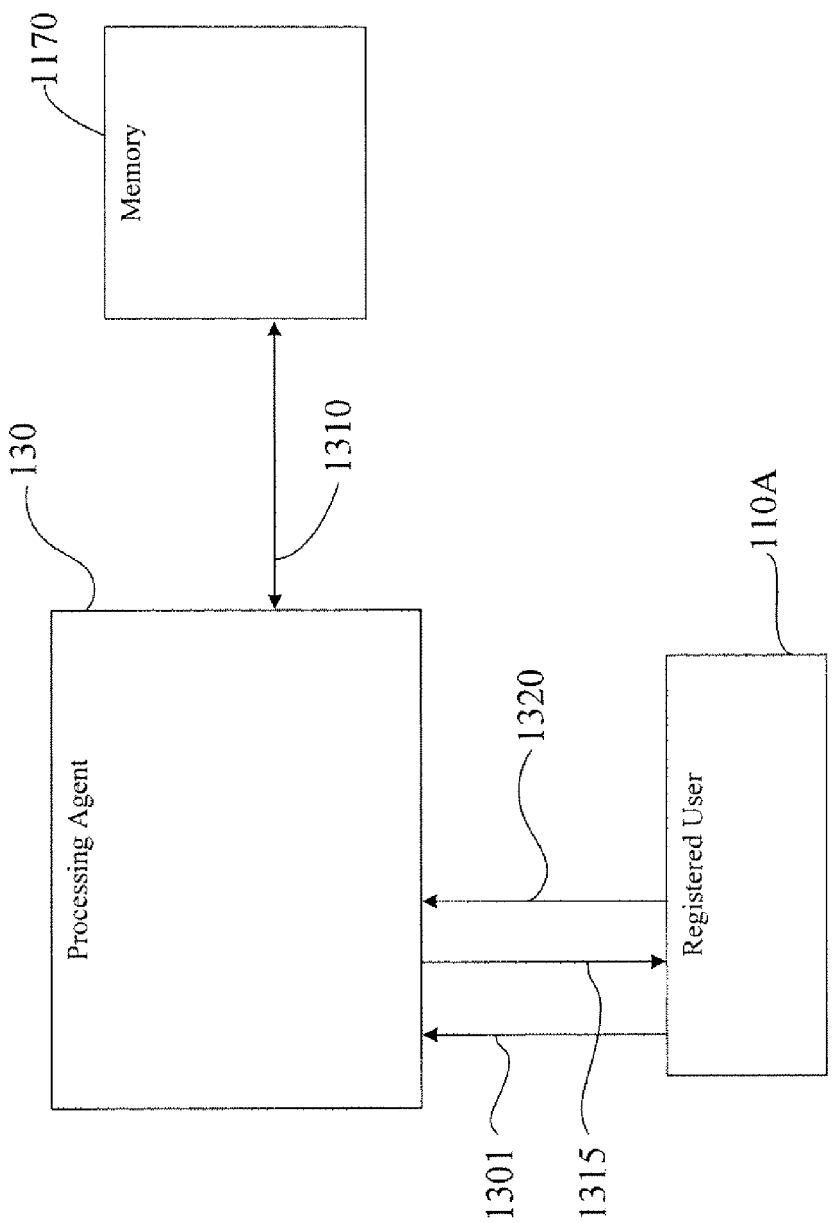
FIG. 13 depicts communications between the processing agent and a registered user to execute a payment on behalf of the registered user in accordance with the present invention.
Figure 14:
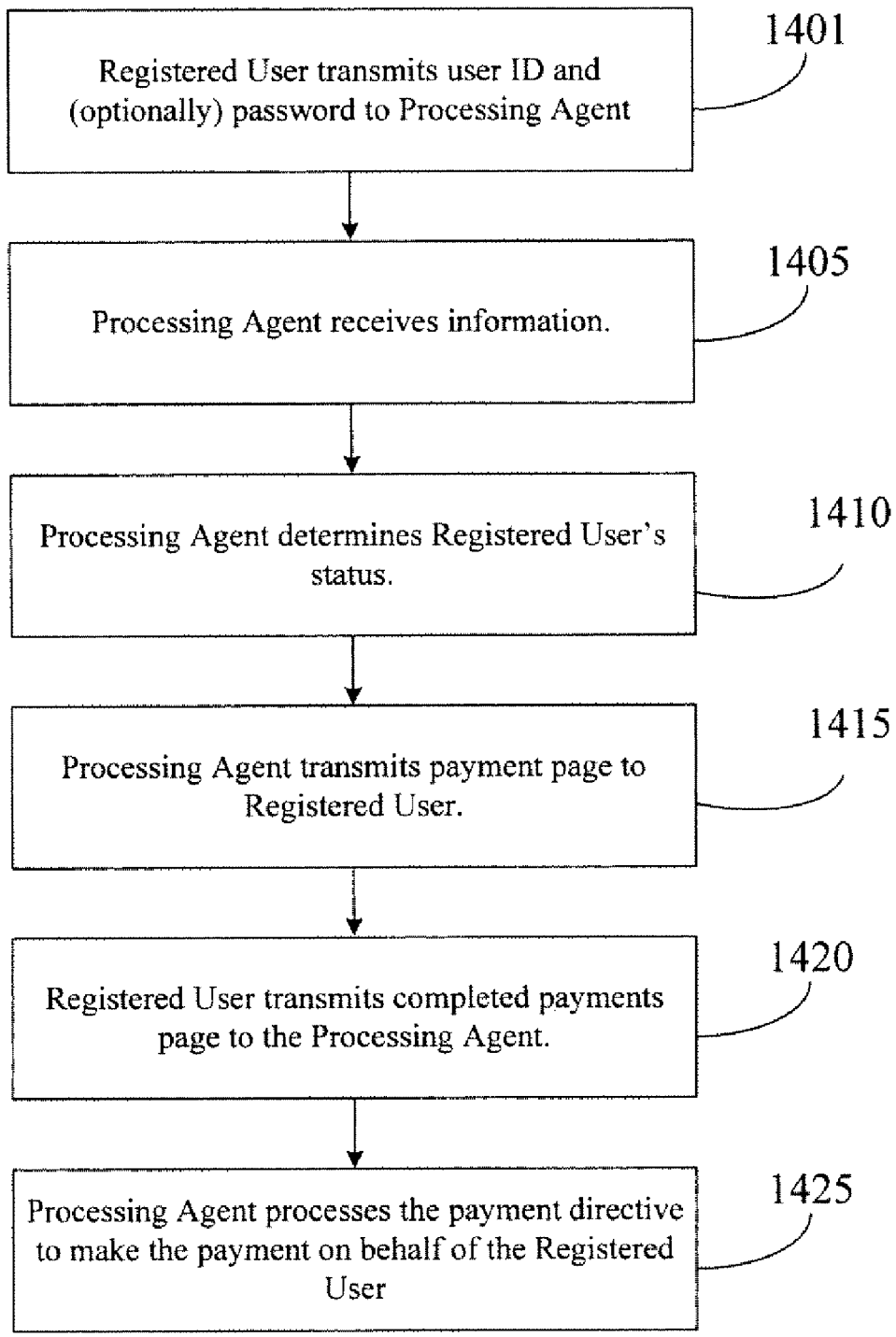
FIG. 14 is a flow chart showing operations which are performed in executing a payment on behalf of the registered user in accordance with the present invention.

To aid in understanding the capabilities of the processing agent 130 in making payments, FIGS. 13 and 14 show the communications for, and steps of, the processing agent effecting a payment on behalf of registered user 110A. Registered user 110A could be making payment of a bill received electronically or via traditional delivery means, could be making an on-line purchase, or could be making a gift payment, among possible types of financial transactions. The registered user 110A contacts the processing agent 130 via communication 1301. During this communication the registered user provides his or her unique identifier and password, step 1401. The processing agent 130 receives this data, step 1405, and accesses database 700, stored in memory 1170, to determine the user's registration status, step 1410 and communication 1310. Via communication 1315 the processing agent 130 transmits a payments page to the user, step 1415.

Figure 15:
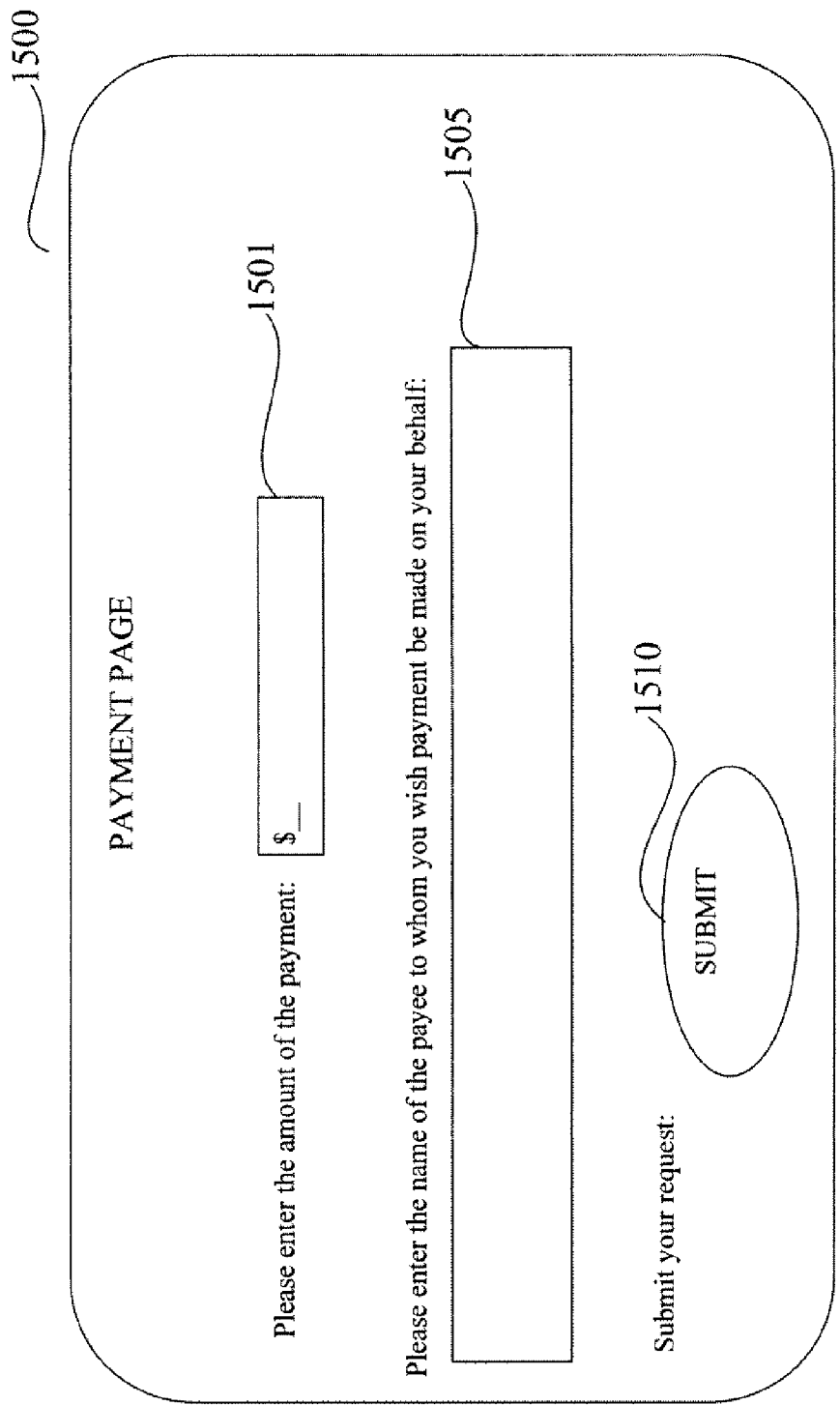
FIG. 15 is an exemplary depiction of a payments page presented to a registered user having the status of an "open" user in accordance with the present invention.

If the processing agent 130 determines that registered user 110A has the status of "open", the payments page could appear as depicted in FIG. 15. The page includes, at a minimum, a field for the user to enter an amount of the payment 1501, and a field for the user to enter the identity of the payee 1505. The identity of the payee could be the payee's unique identifier if the payee is a registered user and if the payer knows the payee's unique identifier. The page also includes a "submit" button 1510, after selection of which the processing agent 130 processes the payment directive.

Figure 6:
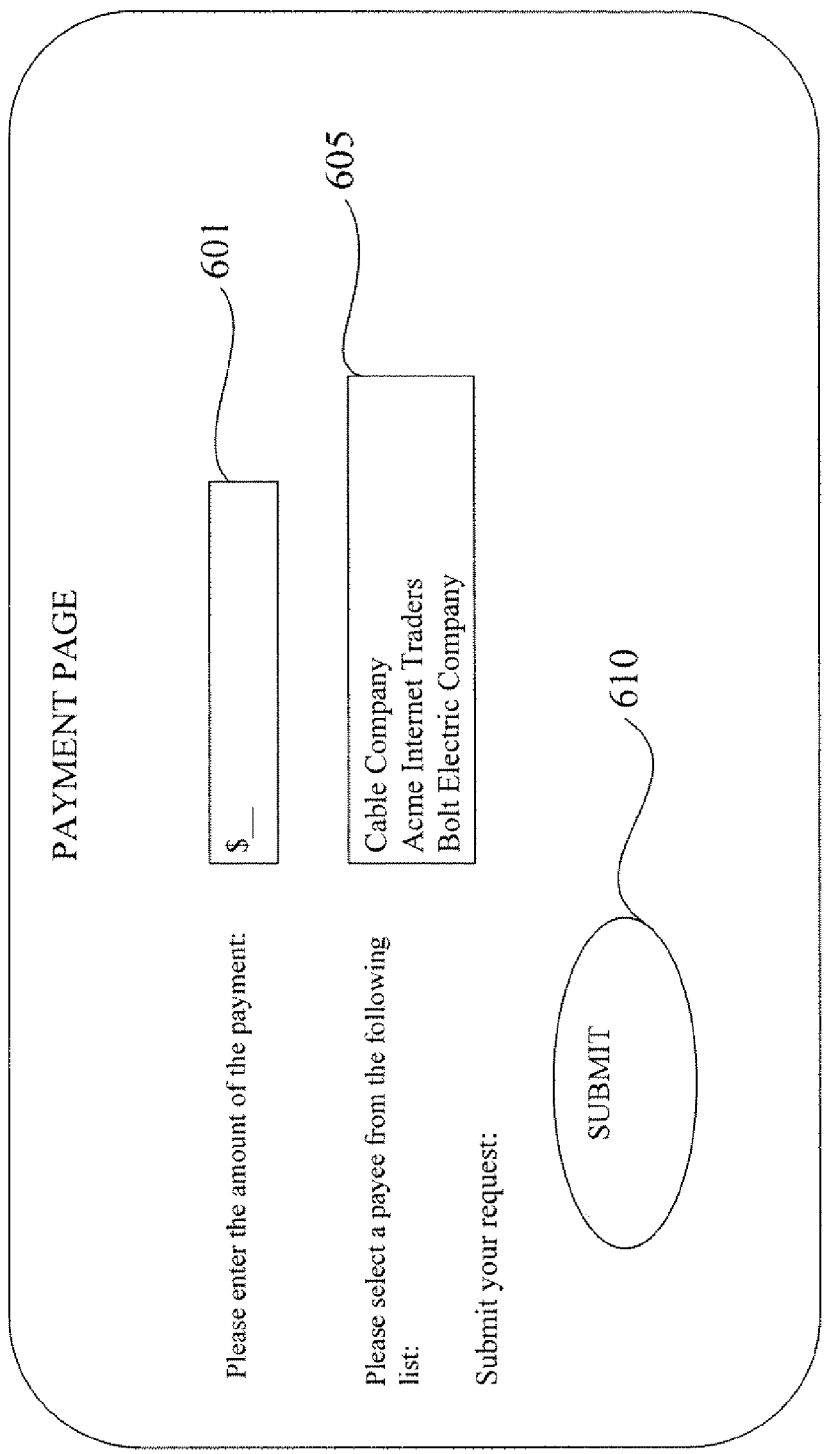
FIG. 6 is an exemplary depiction of a payments page presented to a registered user having the status of a "closed" user in accordance with the present invention.

If the processing agent 130 determines that registered user 110A has the status of "closed", the payments page could appear as depicted in FIG. 6. The page, as above, includes a field for the user to enter an amount of the payment 601. The page also includes a list of preferred payees from which the user selects the payee 605. The list of preferred payees could be presented by various means, as will be understood by one skilled in the art, including a list of names highlightable by the user, a list including selectable icons, each associated with a preferred payee, or the list could be in the form of a pull down menu. The page also includes a "submit" button 610, as described above.

Following completion of a payments page, at step 1420, the registered user transmits the payments page to the processing agent 130 via communication 1320. At step 1425, the processing agent 130 processes the payment directive to make the payment on behalf of the registered user. Payment can be made by any of the methods described above, including electronic payments and paper payments.

The information received from registering user 120A to initiate the registration process may also include a request to make a payment on behalf of the registering user. For registration resulting in "closed" status, if the payee is a preferred payee, the processing agent 130 can immediately execute a payment on behalf of the user. For registration resulting in "open" status, the processing agent 130 can immediately execute a payment on behalf of the user no matter the identity of the payee. Thus, a registering user can not only register in real-time, but also immediately direct payments. Furthermore, as registration is preferably performed real-time while a registering user and the processing agent 130 participate in a communications session, that user may direct a payment during the communications session subsequent to receiving registration confirmation with or without transmitting or knowing his unique identifier. Also, a user may direct a payment without being registered, and without submitting registration information. In such a case, the processing agent 130 will inform the user that the user must register. The payment request will be held until registration is completed. Upon registration, the request will be executed, of course dependent upon the registration status of the user. Thus, the payment request may be received previous to receipt of registration information.

It will also be recognized by those skilled in the art that, while the invention has been described above in terms of one or more preferred embodiments, it is not limited thereto. Various features and aspects of the above described invention may be used individually or jointly. Further, although the invention has been described in the context of its implementation in a particular environment and for particular purposes, e.g. in providing payment services, those skilled in the art will recognize that its usefulness is not limited thereto and that the present invention can be beneficially utilized in any number of environments and implementations. Accordingly, the claims set forth below should be construed in view of the full breadth and spirit of the invention as disclosed herein.

The invention claimed is:

1. A method, comprising:
   maintaining by a processing system comprising one or more server computers, a data repository of registered users, the data repository, comprising information for a first network user having a first registration status that is set to an open status indicating that the processing agent system will, process payment requests on behalf of the first network user to both preferred payees included in a plurality of preferred payees and to at least one other payee not included in the plurality of preferred payees;
   receiving, by the processing agent system, information identifying a second network user;
   determining, by the processing agent system responsive to receiving the information identifying the second network user, a credit risk associated with making payments on behalf of the second network user;

setting, by the processing agent system based at least in part on the determined credit risk, a second registration status for the second network user to a closed status indicating that the processing agent system will only process payment requests on behalf of the second network user to the preferred payees included in the plurality of preferred payees;

transmitting, from the processing agent system for presentation to the first user, an open payment screen that allows payment to both the preferred payees and the at least one other payee; and transmitting, from the processing agent system: for presentation to the second user, when a closed payment screen that only allows payment to the preferred payees.

2. The method of claim 1, wherein receiving information identifying a second network user comprises receiving information identifying the second network user from a sponsor of the second network user.

3. The method of claim 1, wherein setting a second registration status comprises setting the second registration status when the plurality of preferred payees is determined by an entity other than the second network user.

4. The method of claim 3, wherein setting a second registration status comprises setting the second registration status when the entity is a sponsor of the second network user.

5. The method of claim 3, wherein setting a second registration status comprises setting the second registration status when the entity is the processing agent.

6. The method of claim 1, wherein setting a second registration status comprises setting the second registration status based at least in part upon the identity of a sponsor of the second network user.

7. The method of claim 1, wherein a payee is included in the plurality of preferred payees as a result of (i) an agreement between the payee and the processing agent, (ii) an agreement between a sponsor associated with the network user and the processing agent, or (it) an analysis or a history of payments directed to the payee.

8. The method of claim 1, further comprising:
changing, by the processing agent system, the second registration status to the open status.

9. The method of claim 8, wherein determining the credit risk comprises determining a first credit risk, and further comprising:
determining, subsequent to setting the second registration status, a second credit risk associated with making payments on behalf of the second network user,
wherein changing the second registration status to the open status comprises changing the second registration status based at least in part on the determined second credit risk.

10. The method of claim 8, further comprising:
notifying, by the processing agent system, the second network user of the change in the second registration status.

11. The method of claim 8, further comprising:
receiving, by the processing agent system, a request from the second network user to upgrade from the closed status to the open status, wherein the second registration status is changed from the closed status to the open status responsive to the received request.

12. The method of claim 8, further comprising:
storing, by the processing agent system, a payment history associated with the second network user, wherein the second registration status is changed based on the stored payment history.

13. The method of claim 12, wherein changing the registration status based on the stored payment history includes at least one of (i) determining a length of time the second network user has been registered for payment processing, (it) determining a number of payments directed by the second network user, (iii) determining a number of payments directed by the second network user for which a debit was not honored, or (iv) determining a function relating to a number of payments directed by the second network user for which a debit was not honored to a total number of payments directed by the second network user.

14. The method of claim 1 further comprising:
changing, by the processing agent system, the first registration status to the closed status.

15. A system, comprising:
at least one communications port configured to receive and transmit information via a network;
at least one memory configured to store information associated with providing electronic payment services; and
at least one processor in communication with the at least one communications port and the at least memory and programmed to 1) receive, from the at least one communications port, information identifying a network user, 2) determine, responsive to receiving the information identifying the network user, a credit risk associated with making payments by a processing agent on behalf of the network user, 3) set, based at least in part on the determined credit risk, a registration status for the network user to one of a closed status indicating that the processing agent will only process payment requests on behalf of the network user to preferred payees included in a plurality of preferred payees, or an open status indicating that the processing agent wilt process payment requests on behalf of the network user to both the preferred payees and to at least one other payee not included in the plurality of preferred payees, 4) direct, when the registration status is set to the closed status, the transmission of a closed payment screen that only allows payment to the preferred payees; and 5) direct, when the registration status is set to the open status, the transmission of an open payment screen that allows payment to both the preferred payees and the at least one other payee.

16. The system of claim 15, wherein the information identifying the network user is received from a sponsor of the network user.

17. The system of claim 15, wherein the defined plurality of preferred payees is determined by an entity other than the network user.

18. The system of claim 17, wherein the entity is a sponsor of the network user.

19. The system of claim 17, wherein the entity is the processing agent.

20. The system of claim 15, wherein setting the registration status associated with the network user to one of the open status or the closed status is based at least in part upon the identity of a sponsor of the network user.

21. The system of claim 15, wherein the at least one processor is further programmed to:
set the registration status to the closed status prior to determining the credit risk and during a real-time communication session with the network user,
wherein the registration status is set to the open status outside a real-time communication session with the network user.

22. The system of claim 15, wherein a payee is included in the plurality of preferred payees as a result of (i) an agreement between the payee and the processing agent, (ii) an agreement between a sponsor associated with the network user and the processing agent, or (ii) an analysis of a history of payments directed to the payee.

23. The system of claim 15, wherein the at least one processor is further programmed to:
change the registration status to an other of the closed status or the open status.

24. The system of claim 23, wherein the credit risk comprises determining a first credit risk, and wherein the processor is further programmed to:
determine, subsequent to setting the registration status, a second credit risk associated with making payments on behalf of the network user, and
change the registration status to the other of the open status or the closed status based at least in part on the determined second credit risk.

25. The system of claim 23, wherein the at least one processor is further programmed to:
notify the network user of the change in registration status.

26. The system of claim 23, wherein the registration status is initially set to the closed status, and wherein the at least one processor is further programmed to:
receive, via the network and from the at least one communications port, a request from the network user to upgrade from the closed status to the open status, wherein the registration status is changed from the closed status to the open status responsive to the received request.

27. The system of claim 23, wherein the at least one processor is further programmed to:
store a payment history associated with the network user in the at least one memory, wherein the registration status is changed to the other of the closed status or the open status based on the stored payment history.

28. The system of claim 27, wherein the change in the registration status based on the stored payment history includes at least one of (i) determining a length of time the network user has been registered for payment processing, (ii) determining a number of payments directed by the network user, (iii) determining a number of payments directed by the network user for which a debit was not honored, or (iv) determining a function relating a number of payments directed by the network user for which a debit was not honored to a total number of payments directed by the network user.

29. A system, comprising:
means for maintaining, by a processing agent system comprising one or more server computers, a data repository of registered users, the data repository comprising information for a first network user having a first registration status that is set to an open status indicating that the processing agent system will process payment requests on behalf of the first network user to both preferred payees included in a plurality of preferred payees and to at least one other payee not included in the plurality of preferred payees;
means for receiving, by the processing agent system, information identifying a second network user;
means for determining, by the processing agent system responsive to receiving the information identifying the second network user, a credit risk associated with making payments on behalf of the second network user;
means for setting, by the processing agent system based at least in part on the determined credit risk, a second registration status for the second network user a closed status indicating that the processing agent system will only process payment requests on behalf of the second network user to the preferred payees included in the plurality of preferred payees;
means for transmitting, from the processing agent system for presentation to the first user, an open payment screen that allows payment to both the preferred payees and the at least one other payee; and
means for transmitting, from the processing agent system for presentation to the second user, a closed payment screen that only allows payment to the preferred payees.

* * * * *

UNITED STATES PATENT AND TRADEMARK OFFICE
CERTIFICATE OF CORRECTION

| | | |
|---|---|---|
| PATENT NO. | : 7,953,660 B2 | |
| APPLICATION NO. | : 09/820803 | |
| DATED | : May 31, 2011 | |
| INVENTOR(S) | : Ganesan et al. | |

It is certified that error appears in the above-identified patent and that said Letters Patent is hereby corrected as shown below:

Column 20, Line 55 - after "by a processing", insert --agent--.

Column 20, Line 57 - after "repository", remove --,--.

Column 20, Line 60 - after "will", remove --,--.

Column 21, Line 14, Claim 1 - after "agent system", change ":" to --,--.

Column 21, Line 15, Claim 1 - after "second user", remove --when--.

Column 21, Line 30, Claim 5 - change "the processing agent", to --a processing agent associated with the processing agent system--.

Column 21, Line 37, Claim 7 - change "the processing agent", to --a processing agent associated with the processing agent system--.

Column 21, Line 39, Claim 7 - change "the processing agent", to --a processing agent associated with the processing agent system--.

Column 21, Line 39, Claim 7 - after "an analysis", - change "or", to --of--.

Column 21, Line 47, Claim 9 - after "determining", insert --by the processing agent system--.

Column 22, Line 4, Claim 13 - after "processing,", - change "it", to --ii--.

Column 22, Line 33, Claim 15 - change "wilt", to --will--.

Column 23, Line 3, Claim 22 - change "ii", to --iii--.

Signed and Sealed this
Twenty-sixth Day of June, 2012

David J. Kappos
*Director of the United States Patent and Trademark Office*

CERTIFICATE OF CORRECTION (continued)
U.S. Pat. No. 7,953,660 B2

Column 23, Line 10, Claim 24 - remove --determining--.

Column 24, Line 27, Claim 29 - after "network user", insert --to--.